US010846762B1

(12) United States Patent
Dennis et al.

(10) Patent No.: US 10,846,762 B1
(45) Date of Patent: Nov. 24, 2020

(54) BLOCKCHAIN BASED COLD EMAIL CAMPAIGN

(71) Applicant: Turing Technology, Inc., Redwood City, CA (US)

(72) Inventors: Stewart Macgregor Dennis, Redwood City, CA (US); Oleg Kalistratov, Balakhna (RU)

(73) Assignee: TURING TECHNOLOGY, INC., Redwood City, CA (US)

( * ) Notice: Subject to any disclaimer, the term of this patent is extended or adjusted under 35 U.S.C. 154(b) by 80 days.

(21) Appl. No.: 16/147,062

(22) Filed: Sep. 28, 2018

Related U.S. Application Data

(60) Provisional application No. 62/695,682, filed on Jul. 9, 2018.

(51) Int. Cl.
  *G06Q 30/00*    (2012.01)
  *G06Q 30/02*    (2012.01)
  *H04L 12/58*    (2006.01)
  *G06Q 20/06*    (2012.01)

(52) U.S. Cl.
  CPC ....... *G06Q 30/0277* (2013.01); *G06Q 20/065* (2013.01); *H04L 51/12* (2013.01); *H04L 51/18* (2013.01)

(58) Field of Classification Search
  None
  See application file for complete search history.

(56) References Cited

U.S. PATENT DOCUMENTS

| | | | | |
|---|---|---|---|---|
| 7,783,883 | B2 * | 8/2010 | Gasparini | H04L 63/08 713/168 |
| 10,122,661 | B2 * | 11/2018 | Golan | G06F 16/2379 |
| 10,305,833 | B1 * | 5/2019 | Dennis | H04L 67/10 |
| 10,554,649 | B1 * | 2/2020 | Fields | H04L 9/3263 |
| 2018/0053160 | A1 * | 2/2018 | Schwartz | G06Q 20/4014 |
| 2018/0053161 | A1 * | 2/2018 | Bordash | G06Q 20/02 |
| 2018/0374094 | A1 * | 12/2018 | Kohli | G06Q 20/401 |

OTHER PUBLICATIONS

STIC EIC 3600 Search Report for U.S. Appl. No. 16/470,62 dated Apr. 2, 2020 (Year: 2020).*
Salehi et al., "Enhanced genetic algorithm for spam detection in email," In Software Engineering and Service Science (ICSESS), 2011, IEEE 2nd International Conference on, pp. 594-597.
Boykin et al., "Leveraging social networks to fight spam," IEEE Computer Society, 38, No. 4, Apr. 2005, pp. 61-68.
Bouguila et al., "A discrete mixture-based kernel for SVMs: Application to spam and image categorization," Information Processing & Management 45, No. 6 (2009): pp. 631-642.

(Continued)

*Primary Examiner* — Matthew T Sittner
(74) *Attorney, Agent, or Firm* — Haynes Beffel & Wolfeld LLP

(57) ABSTRACT

Systems and techniques are provided for managing and categorizing unsolicited email from unknown senders using blockchain technology. In a specific implementation, an email authorization system authorizes email from advertisement campaigns to reach recipient email inboxes after the email is validated by executing blockchain transactions through the email authorization system. The blockchain transactions are recorded in a blockchain ledger in a blockchain network.

39 Claims, 23 Drawing Sheets

(56) References Cited

OTHER PUBLICATIONS

Salehi et al., "Hybrid simple artificial immune system (SAIS) and particle swarm optimization (PSO) for spam detection," In Software Engineering (MySEC), 2011 5th Malaysian Conference in, IEEE, 2011, pp. 124-129.
Fdez-Riverola et al., "SpamHunting: An instance-based reasoning system for spam labelling and filtering," Decision Support Systems 43, No. 3, 2007, pp. 722-736.
Crispin, "Internet message access protocol-version," 4rev1. No. RFC 3501, 2003, 108 pages.
Klensin, "Simple mail transfer protocol," No. RFC 5321, 2008, 83 pages.
Apeltsin, "A CryptoCubic Protocol for Hacker-Proof Off-Chain Bitcoin Transactions," Cornell University Library, arXiv:1408.2824, 16 pages, Aug. 11, 2014.
Laurie et al., "Proof-of-Work' Proves Not to Work," May 3, 2004, 9 pages.
Myers et al., "RFC 1939—Post Office Protocol," May 1996, 21 pages.
Nakamoto, "Bitcoin: A Peer-to-Peer Electronic Cash System," www.bitcoin.org, Oct. 31, 2008, 9 pages.

\* cited by examiner

FILTER — 506

| USER ID | ALLOWED ADDRESS | OPTIONAL |
|---|---|---|
| 1001 | ProfDolittle@cs.umn.edu | |
| 1001 | bitbounce.io | |
| 1002 | RichardMDavis@rhyta.com | |
| 1004 | EliseJWeber@jourrapide.com | |
| 1004 | Mary.Smith@smiths.com | |
| 1004 | yahoo.com | |
| 1004 | marysu@franklinhamilton.com | |
| 1006 | roofy.com | |

REGISTERED EMAIL SOURCE — 508

| ID | EMAIL SOURCE | EMAIL CONTENT | EMAIL DELIVERY FREQUENCY | MAXIMUM TOKEN BUDGET | MAXIMUM TOKEN BUDGET PER RECIPIENT | OPTIONAL |
|---|---|---|---|---|---|---|
| 1001 | ProfDolittle@cs.umn.edu | [...] | ONE-TIME | 50,000 | | |
| 1002 | RichardMDavis@rhyta.com | [...] | ONE-TIME | 20,000 | | |
| 1004 | marysu@franklinhamilton.com | [...] | ONE-TIME | 20,000 | | |
| 1007 | toprecruiter.com | [...] | DAILY | 100,000 | 100 | |
| 1008 | jobfinder.org | [...] | WEEKLY | 20,000 | 2000 | |
| | | | | 50,000 | 50 | |

UNAUTHORIZED EMAIL — 510

| EMAIL ID | SUBJECT | EMAIL ACCOUNT ID | SENDER ADDRESS | CURRENT FOLDER | TOKEN RECEIVED? | OPTIONAL |
|---|---|---|---|---|---|---|
| 1 | GET PAID $500/hr | A101 | JohnKelly@yahoo.com | UNAUTHORIZED | FALSE | |
| 2 | Job recommendation | A105 | Mary.Smith@smiths.com | INBOX | TRUE | |
| 3 | *FREE VACATION* | A101 | goodlife@gmail.com | UNAUTHORIZED | FALSE | |
| 4 | Invitation to join ACM Artificial Intelligence Committee | A106 | ProfDolittle@cs.umn.edu | INBOX | TRUE | |

FIG. 10

BLOCKCHAIN ADDRESS FOR UNAUTHORIZED EMAIL — 512

| EMAIL ID | EMAIL BLOCKCHAIN ADDRESS | TRANSACTION MADE? | OPTIONAL |
|---|---|---|---|
| 1 | N0zmDwVrWc | FALSE | |
| 2 | sFlpgWUUYq | TRUE | |
| 3 | zxmaF18M4l | FALSE | |
| 4 | 2zblUwBTmv | TRUE | |

FIG. 11

CAMPAIGN EMAIL

514

| EMAIL ID | EMAIL SOURCE ID | EMAIL ACCOUNT ID | BLOCKCHAIN ADDRESS | TOKEN RECEIVED | STATUS | OPTIONAL |
|---|---|---|---|---|---|---|
| 1 | 1004 | 104 | DD6BSLAJf0 | 10 | DELIVERED TO INBOX | |
| 2 | 1004 | 105 | BOcmV4jShR | 100 | SENT | |
| 3 | 1004 | 107 | VnMRhTxkLz | 5 | DELIVERED TO INBOX | |
| 4 | 1004 | 107 | iLy6vukGrb | 5 | SENT | |

INTERNAL WALLET SERVICE

530

| USER ID | TOKEN AMOUNT | BLOCKCHAIN ADDRESS | PRIVATE KEY(S) | OPTIONAL |
|---|---|---|---|---|
| 1007 | 5000.00 | NcuCbHEf3W | [..] | |
| 1004 | 890.00 | RID5YXjZpe | [..] | |
| 1008 | 10000.00 | r6f0T9BM3w | [..] | |
| 1007 | 10.00 | LFvuSE8dAF | [..] | |
| 1004 | 50.00 | Eydkv43SB9 | [..] | |

| EMAIL BLOCKCHAIN ADDRESS | TIMESTAMP | TOKEN RECEIVED |
|---|---|---|
| 2zblUwBTmv | 2017-09-12T22:56:33+00:00 | 2000 |

FIG. 26B

BLOCKCHAIN BASED COLD EMAIL CAMPAIGN

PRIORITY APPLICATION

This application claims the benefit of U.S. Provisional Patent Application No. 62/695,682, filed 9 Jul. 2018; which application is incorporated herein by reference.

BACKGROUND

Field

The present invention relates to authorization of email from unknown senders, and more particularly, to authorizing email from unknown senders to be delivered to recipients using blockchain technology.

Description of Related Art

Electronic mail (email) is a fast and powerful tool for information exchange between individuals and organizations. Due to the immense popularity, low cost, and fast delivery characteristics of email, the technology is prone to be misused. In recent years, a vast majority of email traffic could be considered spam. Spammers create and exploit free webmail accounts, and send spam email directly to mailboxes of victims by exploiting the computational power and network bandwidth of their hosts. Spam email is also used to spread threats, including malicious software (e.g., Internet worms, Trojan horses, computer viruses and spyware) and phishing (i.e., attacks that seek to acquire sensitive information from spam email recipients). Spam email is not only a nuisance for the email users but, additionally, costs billions of dollars in productivity losses.

Apart from spam email, email users may also receive another form of unsolicited email from unknown senders referred to herein as "cold" email. A cold email is an email that is sent to a recipient, without, or treated by the system as if there has not been, sufficient prior contact or prior arrangement between the sender and the recipient. Although as used herein the term "cold email" is not intended to imply any specific feature, content or category of email treated as such, examples of cold email can include email from job seekers to potential employers, from entrepreneurs to investors, from salespeople to corporate executives and customers for potential business opportunities, from recruiters to potential job candidates, and so on. While cold email can be sent with good intentions from genuine senders (e.g., a job seeker sending a well-written email to one potential employer), in some instances the sender can be considered a borderline spammer (e.g., a fresh college graduate sending a generic email inquiring about available positions to twenty potential employers). Communicating with target recipients via cold email is somewhat risky for cold email senders as there is no guarantee that the target recipient will respond to the email reliably.

Many spam filtering methods are used by email service providers and organizations to filter out spam email. The spam filtering methods may even filter out cold email from unknown senders. There are three main approaches to spam filtering: content-based filtering, real-time blacklisting, and sender reputation mechanisms. Content-based filtering refers to techniques in which the body of the email, attached executables, pictures or other files are analyzed and processed to determine whether the email can be classified as spam. Significant computational resources are wasted on the filtering process, thus making it fairly costly. Real-time blacklisting is another technique for mitigating spam by maintaining a "blacklist" of locations, or Internet Protocol (IP) addresses on the Internet reputed to send spam email. Internet Service Providers (ISP) and email server software can be configured to reject or flag messages which have been sent from a site listed on one or more such blacklists. Although real-time blacklisting is a fast filtering process, it is not very effective as spammers can bypass the blacklists by repeatedly changing their IP addresses. Another shortcoming of real-time blacklisting is that whenever an IP prefix is blacklisted, both spammers and benign senders who share the same prefix might be rejected. Sender reputation mechanisms for spam email mitigation are a collection of methods for computing the reputation of email senders. The computation is usually based on information extracted from the network, the transport level, social network information or other useful identifiers. When a sending pattern of a sender reflects that of a spammer, his reputation typically decreases. If the reputation of a sender goes below a predefined threshold, the system typically rejects the sender email, at least until the sender gains some reputation, by changing sending properties. Various Machine learning algorithms for computing sender reputation from data sets include Bayesian classifier (P. Boykin et al., Leveraging Social Networks to fight Spam, IEEE Computer, 38(4), pp. 61-68, 2005), support vector machine-based classifier (N. Bouguila et al., A discrete mixture-based kernel for SVMs: application to spam and image categorization, Information Processing & Management, 45, pp. 631-642, 2009), genetic algorithm (S. Salehi et al., Enhanced genetic algorithm for spam detection in email, 2nd IEEE International Conference on Software Engineering and Service Science, pp. 594-597, 2011), artificial immune system (S. Salehi and A. Selamat, Hybrid simple artificial immune system (SAIS) and particle swarm optimization (PSO) for spam detection, 5th IEEE Malaysian Conference on Software Engineering (MySEC), pp. 124-129, 2011), and case-based technique (F. Fdez-Riverola et al., SpamHunting: An instance-based reasoning system for spam labeling and filtering, Decision Support Systems, 43, pp. 722-736, 2007).

Email recipients may use the spam filtering methods described above to filter out spam email and email from unknown senders. Therefore, an advertiser would be unable to send advertisement email to such email recipients as the advertiser is an unknown contact to the email recipients.

It is desirable to provide an email exchange solution that validates advertisement email for email recipients and allows the advertisers to have a more effective marketing campaign.

SUMMARY

A system and a method are provided that can be used for filtering out spam and non-genuine cold email, while presenting a technological approach to bypass spam filtering based on authorization protocols.

In one embodiment, email in a recipient email channel is selected using filters, for example, where the filters may apply algorithms to select email as unauthorized that is not part of an established list (white list) associated with the recipient, not validated as a genuine cold-email or not associated with other processes that can classify incoming email. The selected email can be tagged as not authorized, and can in some cases be blocked from delivery to the recipient email inbox, or removed from the recipient email inbox. Procedures are described by which an email first selected as unauthorized can be authorized by execution of an authorization procedure.

In one example, the authorization procedure for a particular selected email includes creating an individual blockchain address, and sending a message to the sender advising of the particular selected email, prompting execution of a blockchain transaction associated with the individual blockchain address of the particular filtered email. A sender of a genuine cold email may validate the particular selected email by executing the blockchain transaction associated with the individual blockchain address of the particular filtered email. The blockchain transaction will be recorded in a blockchain ledger maintained by a blockchain network. The blockchain ledgers in the blockchain network are monitored to detect the completion of the prompted blockchain transaction. After the system detects and verifies a record for the prompted blockchain transaction in the blockchain network, the particular selected email from the sender can be classified as authorized, and in some cases can be moved out of a message folder holding unauthorized email and into the recipient email inbox.

In one embodiment, a validation process of a particular cold email from an email source, which may be otherwise blocked by a whitelist filter, is initiated by executing a blockchain transaction associated with the recipient of the particular cold email and the blockchain address of the email source. An authorization flag validated by the blockchain transaction is included in the cold email. The particular cold email with the authorization flag is then delivered to the email inbox folder for the recipient email address. The email inbox of the recipient of the cold email is monitored with a whitelist filter to detect spam email and email from unknown senders. Email messages with authorization flags are allowed to remain in the email inbox of the recipient. In another embodiment, a record of cold email with authorization flags sent to various recipient email accounts from different email sources is maintained, and authorizing the particular cold email includes establishing the number of email messages including authorization flags sent to the selected recipient email account by the particular email source from the list of email messages, and blocking the particular cold email message if the number of email messages exceeds a predetermined number of allowed email messages with authorization flags.

In one embodiment, executing a transaction to authorize a particular cold email from an email source includes creating an individual blockchain address, and validating the cold email by executing a blockchain transaction associated with the individual blockchain address of the particular email source. In another embodiment, executing a transaction includes maintaining records of accounts associated with recipient email accounts, and linking the blockchain addresses associated with the particular email source and encryption keys for blockchain transactions to the record of accounts associated with the selected recipient email account.

In one embodiment, the blockchain transactions have specified characteristics, such as involving a transfer of a predetermined amount of cryptocurrency to the individual blockchain address associated with the email. Other types of blockchain transactions can be used as well, such as transfer of a specified cryptographic token, or proof of performance of an obligation set in a blockchain contract.

Embodiments of the technology described herein, or elements thereof, can be implemented in the form of a computer product including a non-transitory computer-readable storage medium with the computer usable program code for performing the method steps indicated. Furthermore, embodiments of the invention or elements thereof can be implemented in the form of an apparatus including a memory and at least one processor that is coupled to the memory and operative to perform exemplary method steps. Yet further, in another aspect, embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

Target recipients will benefit from an email handling system that identifies email from serious, genuine cold email senders and validated cold email broadcasting campaigns in their inboxes. Genuine senders of cold email and cold email broadcasting campaigns will benefit from some sort of confirmation that the target recipients have received their email.

These and other features, aspects, and advantages of the invention will become apparent from the following detailed description of illustrative embodiments thereof, which is to be read in connection with the accompanying drawings.

BRIEF DESCRIPTION OF THE DRAWINGS

FIG. 8 is a symbolic drawing indicating how the filter database in FIG. 5 is organized, according to an embodiment of the invention FIG. 9 is a symbolic drawing indicating how the registered email source database in FIG. 5 is organized, according to an embodiment of the invention.

FIG. 10 is a symbolic drawing indicating how the unauthorized email database in FIG. 5 is organized, according to an embodiment of the invention.

FIG. 11 is a symbolic drawing indicating how the blockchain addresses for the unauthorized database in FIG. 5 is organized, according to an embodiment of the invention.

FIG. 12 is a symbolic drawing indicating how the campaign email database in FIG. 5 is organized, according to an embodiment of the invention.

FIG. 13 is a symbolic drawing indicating how the internal wallet in FIG. 5 is organized, according to an embodiment of the invention.

FIGS. 26A and 26B (hereafter FIG. 26) illustrate an example blockchain ledger data structure in a blockchain network that implements the technology disclosed.

DETAILED DESCRIPTION

Figure 1:
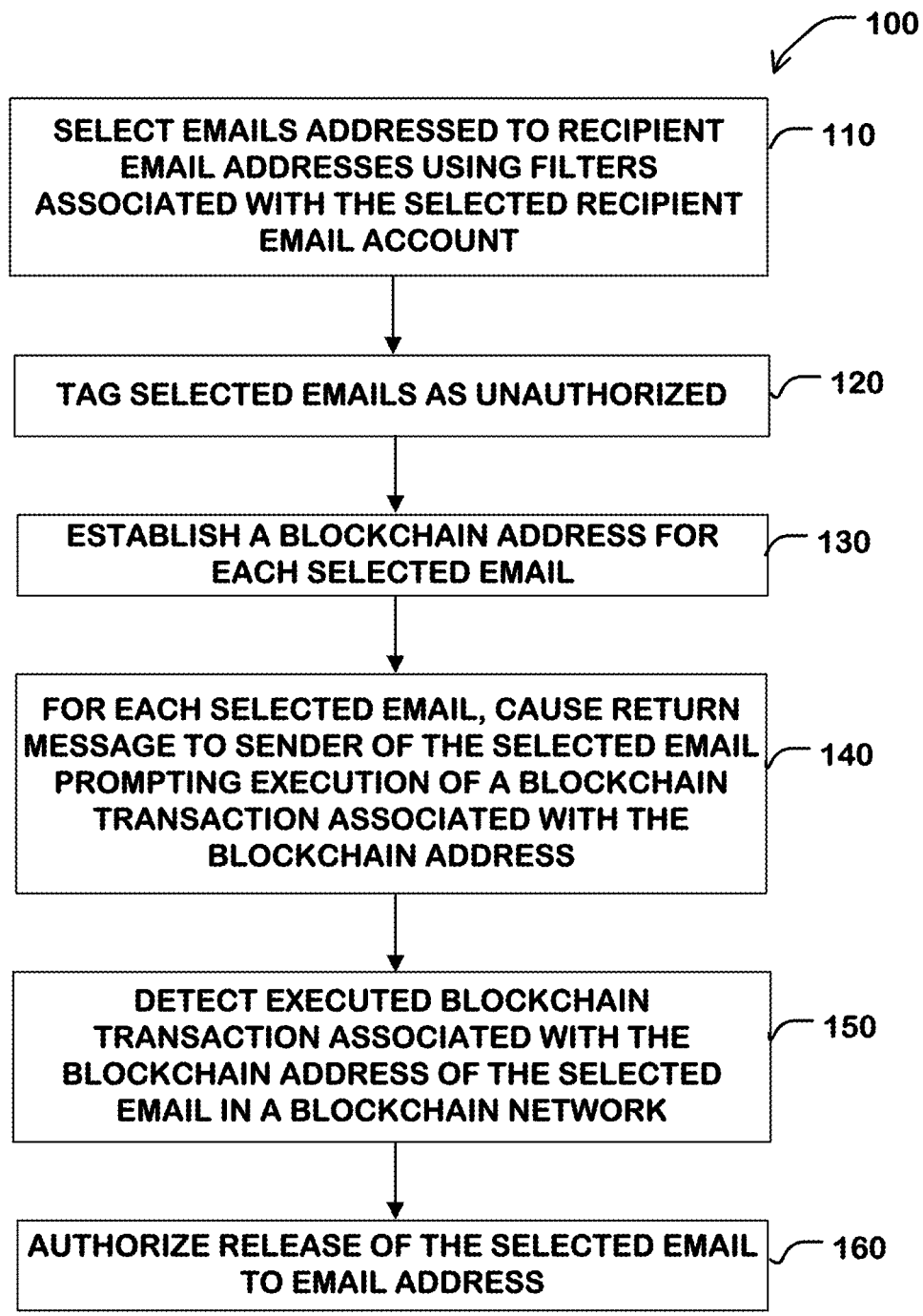
FIG. 1 illustrates a first example process flow of an email authorization system.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Email, short for Electronic Mail, is a method of exchanging messages between people using electronics. Email operates across computer networks, which today is primarily the Internet. Email messages include two major sections, the message header, and the message body. The header is structured into fields such as From (specifying the sender), To (specifying one or more recipients), Subject, Date, and other information about the email. The body contains payload, for example, the message in HTML format and/or as unstructured text. In addition to the message body, images, multimedia or documents can also be attached to email.

An email server is a computer program or a network node that serves as an electronic post office for email. Email exchanged across networks is passed between email servers. Email servers can comprise an email server software which is built around agreed-upon, standardized protocols for handling email. An example of such a protocol is Simple Mail Transfer Protocol (SMTP). Various computer software that can be used to run an email server includes Novell Groupwise™, Lotus Notes™, Microsoft Exchange Servers™, Sendmail™, Postfix™, and Exim™. An email server can also run as a web-based email platform, such as Gmail™, Hotmail™, or Yahoo! Mail™. Most email server systems can be based on a store-and-forward model where email servers accept, forward, deliver, and store messages for email users. Neither the users nor their email receiving devices are required in some systems to be online continuously to receive or send email; they need to connect only briefly for as long as it takes to send or receive messages. In the process of transporting email messages between email servers, SMTP communicates delivery parameters and information using email message header fields.

In order to send or receive email, an email user can use an email account on an email server. An email address identifies an email account to which email messages to the user are delivered. The general format of an email address is local-part@domain, and a specific example is jsmith@example.com. The part before the @ symbol (local-part) identifies the name of the email account. This is often the username of the recipient, e.g., j smith. The part after the @ symbol (domain) is a domain name that represents the administrative realm for the email account, e.g., an email server domain name, example.com. A single email account may receive email from multiple email addresses. Email channels are, for the purposes of this disclosure, a communication link on which email in the system of email servers is transported among email servers and email clients. A recipient email channel can include a number of nodes, including an email client associated with the recipient email address, and email servers acting as email transfer agents in the network for the recipient email address. An "inbox" is used herein to refer to a mailbox folder for the recipient email address designated to act as a delivery point for newly-delivered email in an email channel. In a typical email client, incoming email from the email channel or channels serving the email client are placed in an inbox, and can be presented as inbox email on a user interface on the platform in use by the email client. A client may have more than one message folder acting as inboxes, and sets of rules in place to direct email to particular message folders.

In addition to sending and receiving email, an email user can also maintain a "contact list" to store email addresses and other contact information of known contacts. In some embodiments, email domains and Internet Protocol (IP) addresses can also be stored in an email user contact list. Such contact lists are typically deployed to assist composition of email to be sent, and to provide information associated with the senders of email that has been delivered to the email client.

In some embodiments, the email authorization system can be used in conjunction with one or more spam filtering methods.

FIG. 1 illustrates a first example process flow 100 of an email authorization system that processes email in an email channel of a recipient email account. In some embodiments, the actions in the process flow may be performed in different orders and/or with different, fewer or additional actions than those illustrated in FIG. 1. Multiple actions can be combined in some implementations.

The email authorization system begins at step 110 by selecting email addressed to a recipient email address from an email channel using a classification procedure, such as a filter. The email channel may be monitored for new email, such as by periodically polling a message folder in the email channel for an email client, or by configuring the email channel to forward new email to a designated message folder used by the classification procedure. In some embodiments, the monitoring of the email channel includes periodically accessing the email recipient primary inbox to identify new email. In other embodiments, the monitoring of the email channel can include accessing a message folder other than the primary inbox, through which incoming email may be buffered in the email channel before delivery to the primary inbox. The email authorization system includes a procedure that traverses email inbox folders, or other points in an email channel, of registered email addresses in some embodiments, removing particular selected email messages from the email inbox folders (or another point), and saving the particular selected email message in a folder or folders for unauthorized email for the registered email accounts. The email authorization system selects email for processing by applying the classification procedure to email in email channels of registered email accounts.

A filter to be used for classification of incoming email can be composed using identifying parameters associated with email. Email classified, using the filter or other procedure, as unauthorized can be tagged so that the email client is notified of the unauthorized status, or so that the unauthorized email can be moved into a message folder designated for unauthorized email, and out of the inbox.

The identifying parameters used in a filter can include for example components in an email message header, e.g., sender email address, email address domain, IP address from which the email originated, tags that indicate that the email is authorized to be included in the inbox, etc. In some embodiments, the filter may recognize one or more "authorization tags" in the email message header. An authorization tag indicates that the email containing the authorization tag has been authorized by the email authorization system to bypass the filter.

In some embodiments, the recipient contact list can be additionally used to populate the filter applied for email to that recipient. A filter based on known contacts can be referred to as a "whitelist" filter, as opposed to a "blacklist" filter in which the filter is based on known or suspected spam email. For an example of a whitelist, if an email address of the sender, domain of the email address, or IP address from which the email originated, includes an identifying parameter set in the filter based on a contact list, the email is not selected.

If the email does not include any authorization tags or an identifying parameter set based on the known contact list, such as one of the addresses of the sender, the domain of the email address, or IP address from which the email originated, the email is selected by the email authorization system as an unauthorized email. Any email not selected by the email authorization system may be classified as authorized, and moved into, or left in, the recipient inbox, or otherwise identified as an authorized email.

Process flow 100 continues at step 120 where the email authorization system tags the selected email as being unauthorized. As described herein, "tagging" an email indicates the email authorization system classified the email as unauthorized, and can comprise setting a parameter associated with the selected email in its header or otherwise, enabling it to be marked in a user interface as unauthorized. Also, tagging the email can include causing it to be removed by the email authorization system from the inbox or other message folder at the recipient client, and causing it to be stored in a message folder designated for unauthorized email and other actions related to storage of the email. In some embodiments, a tagged email is moved to a secondary folder in the recipient email account, such as an "unauthorized" folder. As described herein, an "unauthorized" folder is a folder in the email account that stores tagged email that has not been authorized by the email authorization system to be included in the recipient email inbox. In some embodiments, the selected email may initially be placed in the inbox folder and then removed from the recipient inbox after being tagged by the email authorization system. In some embodiments, the email authorization system may apply the filter to, and tag, an email in the email channel before the email reaches the recipient inbox and redirect the tagged email to a location other than the recipient inbox. In some embodiments, filtering of unauthorized email may be done in two stages: one stage for selecting email using the whitelist filter, and the other stage to select email with authorization tags.

Referring to FIG. 1, at step 130, the email authorization system establishes a blockchain address for the selected email. In some embodiments, the blockchain address is randomly generated using a public key associated with a private key that is used to encrypt transactions associated with the address. The public key/private key pair can be produced using public key cryptography. Public key cryptography uses pairs of keys: (i) public keys which may be disseminated widely, and (ii) private keys which are known only to the owner of the key. Public key cryptography accomplishes two functions: authentication, which is when the public key can be used to verify that a holder of the paired private key sent the message, and encryption, whereby only the holder of the paired private key can decrypt the message encrypted with the public key. In a public key cryptography system, any person can encrypt a message using the public key of the receiver, but such a message can be decrypted only with the private key of the receiver. Private keys can be stored in desktop wallets (wallet service available on that particular machine the wallet service has been installed), cloud wallets (wallet service hosted by a third party), mobile wallets (any wallet that exists on a device that will ever connect to the Internet), hardware wallets (physical devices), or paper wallets (printing out the private keys on a piece of paper which will then be stored in a secure place).

In one embodiment, the private key used to produce the blockchain address of particular selected email of an email recipient is generated and stored in a digital "wallet" of the email recipient. A digital wallet is a software program that maintains blockchain addresses and private keys held by the account holders, and supports the execution of blockchain transactions by which users send or receive cryptocurrency, pay for goods or save cryptocurrency.

Cryptocurrency is a digital asset designed to work as a medium of exchange to secure transactions between two parties using cryptography. Numerous digital wallets exist today such as Coinbase™, Bread Wallet™, Mycelium™, Exodus™ Copay™, Jaxx™, Armory™, Trezor™, Ledger Nano™, Green Address™, and Blockchain.info™. In some embodiments, the email authorization system may host its own digital wallet.

Referring to FIG. 1, at step 140, the email authorization system causes a message to be composed and sent to the sender of a particular selected email, prompting the sender to validate the selected email by executing a blockchain transaction associated with the blockchain address created for the selected email. The message can include links or software to facilitate or enable the execution of a blockchain transaction having specified characteristics.

In one embodiment, the blockchain transaction involves causing the blockchain network to add a record in the blockchain ledger that includes the specified characteristics required for authorization of the selected email, such as a transfer of a predetermined type of token from the sender of the selected email to the recipient, transfer of a specified amount of cryptocurrency, or performance of a condition or obligation of a blockchain contract. On completion of the blockchain transaction, a party monitoring the blockchain network will be able to detect the completion of the blockchain transaction. As described herein, "token" is a means to enable the authorization of an email, selected and tagged by the email authorization system, for its intended recipient inbox. In one embodiment, cryptocurrencies can be used as a form of token. Numerous cryptocurrencies exist today such as Bitcoin™, Ethereum™, Credo™ Bitcoin Cash™, Ripple™, Litecoin™, Dash™, Peercoin™, Namecoin™, Dogecoin™ Primecoin™, and Mastercoin™. For techniques described herein, any form of cryptocurrency can be used as tokens to execute a blockchain transaction.

The sender validates the particular selected email by executing the blockchain transaction associated with the blockchain address created for the selected email, and the executed transaction is recorded in a blockchain ledger in a blockchain network. The blockchain transaction is broadcasted to a blockchain network, specifying the blockchain address and the characteristics of the transaction, such as an amount of cryptocurrency that has been transferred.

A blockchain network hosts one or more open, distributed blockchain ledgers that can record cryptocurrency transactions between two parties efficiently and in a verifiable and permanent way. The safety, integrity, and balance of all blockchain networks are ensured by a group of mutually distrustful parties, referred to by terms such as miners or stakers, who actively protect the network by maintaining a consensus algorithm. In some embodiments, the consensus algorithm may be the proof-of-stake algorithm (PoS). Other consensus algorithms that can be used for techniques described herein are the practical *Byzantine* fault tolerance algorithm (PBFT), the proof-of-work algorithm (PoW), the delegated proof-of-stake algorithm (DPoS), the proof-of-authority algorithm (PoA) and the proof-of-importance algorithm (PoI). Each time a blockchain transaction is broadcasted on the blockchain network, a "miner" processes the blockchain transaction to ensure that all the information in the blockchain transaction is correct and then updates the blockchain network. For a blockchain transaction to be confirmed, it must be included in a "block" along with a mathematical proof performed by the miner based on the consensus algorithm employed by the blockchain network. These proofs are very difficult to generate and are designed to depend on the previous block, making it exponentially difficult to reverse previous blockchain transactions. Validation (or confirmation) of a blockchain transaction in a blockchain network may require confirmations on the blockchain network, with each successive confirmation adding greater confidence that a blockchain transaction is valid. A confirmation means that there is a consensus on the network that, for example, cryptocurrency involved in the transaction has not been sent to anyone else and is the property of the email recipient.

Referring to FIG. 1, at step 150, the email authorization system maintains a list of unauthorized email messages, with information identifying the characteristics of the blockchain transaction prompted for each in the return email. The email authorization server detects executed blockchain transactions in the blockchain ledgers in the blockchain network associated with the blockchain addresses of email in the list of unauthorized email. For detected transactions, the authorization server verifies that it matches the prompted transaction for an email tagged unauthorized. In one embodiment, detection of the blockchain transactions is accomplished by notification from a digital wallet service, which may notify the email authorization system of the completed execution of the blockchain transaction. In another embodiment, the email authorization server detects blockchain transactions by polling the blockchain for new blocks containing transactions for the blockchain addresses of the unauthorized email. At step 160, the email authorization system authorizes the selected email if the selected email has been validated by a prompted blockchain transaction which has been confirmed as executed. The authorization can be executed by removing the unauthorized tag, by moving the email out of the unauthorized list into the recipient email channel or inbox, or otherwise.

Figure 2:
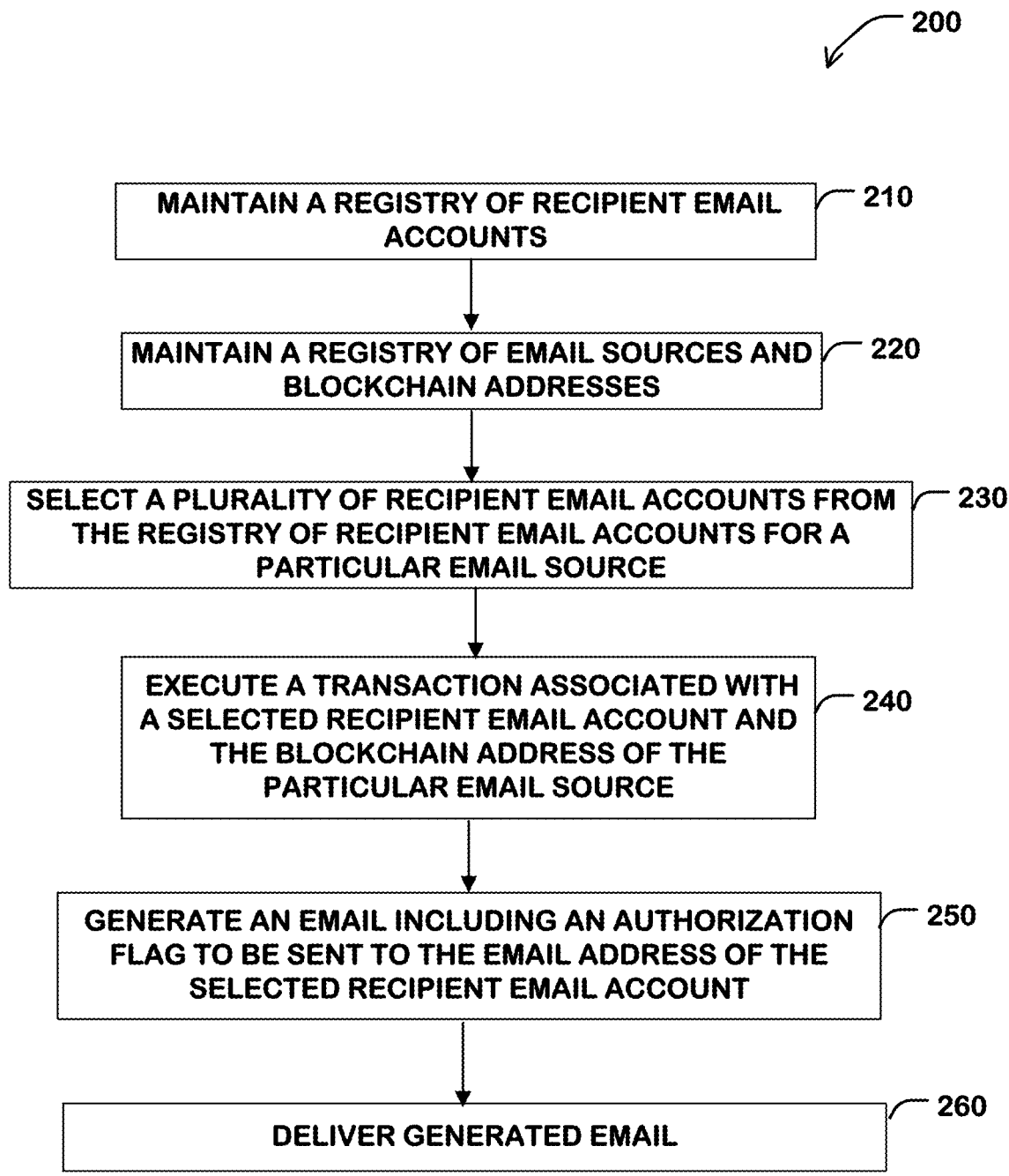
FIG. 2 illustrates a second example process flow of an email authorization system.

FIG. 2 illustrates a second example process flow 200 of the email authorization system that processes and authorizes cold email to be sent to recipient email accounts. In some embodiments, the actions in the process flow may be performed in different orders and/or with different, fewer or additional actions than those illustrated in FIG. 2. Multiple actions can be combined in some implementations.

The process flow 200 begins at step 210 where the email authorization maintains a list of registered recipient email accounts and email addresses associated with the email accounts. The email authorization system monitors the email channels of the registered email accounts for new email and selects email for processing by applying a classification procedure, such as a filter. The email authorization system may periodically poll the inbox folder of the email accounts, or configure the email channels to forward new email to a designated message folder used by the classification procedure. In some embodiments, the filter may recognize an "authorization tag" in the email message header, the authorization tag indicating that the email authorization system has validated the email to originate from a genuine cold email sender. In some embodiments, the filter may be based on known contacts in the email account contact list (i.e., a "whitelist" filter). If an email in one of the registered email accounts does not include any authorization tags or an identifying parameter set based on the known contact list, such as one of the addresses of the sender, the domain of the email address, or IP address from which the email originated, the email is selected by the email authorization system as an unauthorized email. Any email not selected by the email authorization system may be classified as authorized, and moved into, or left in, the recipient inbox, or otherwise identified as an authorized email.

Process flow 200 continues at step 220 where the email authorization system maintains a list of email sources associated with registered cold email senders. The email authorization system also maintains a list of blockchain addresses associated with the email sources. The email authorization system may receive a request from an email source to validate and send cold email to a plurality of registered email accounts. In one embodiment, an email source may specify the frequency at which cold email will be delivered to registered email accounts. The email authorization system will schedule validation and delivery of cold email according to the specified frequency. In one embodiment, an email source may specify a maximum token budget required by the email authorization system to validate cold email messages. In one embodiment, an email source may specify the maximum number of tokens that can be used to validate a single cold email. In another embodiment, the email authorization system hosts an interface configured to enable registered email sources to compose a cold email, specify an email delivery frequency, a maximum token budget, and/or a maximum daily token budget, and input a request to the email authorization system to deliver the composed email to one or more registered email accounts. The token budgets may be a predetermined type of token from the sender of the selected email to the recipient, characteristics of the email campaigns, transfer of a specified amount of cryptocurrency, or performance of a condition or obligation of a blockchain contract.

The request by the email source may be associated with blockchain transactions. The blockchain transactions are associated with blockchain addresses. In one embodiment, the blockchain addresses are created by the email authorization system. In another embodiment, the email sources' digital wallets may create the blockchain addresses. In one embodiment, the blockchain transactions involve causing the blockchain network to add a record in the blockchain ledger that includes the specified characteristics required for validation of the cold email messages of the email source, such as a transfer of a token budget from the email source to the email authorization system, transfer of a specified amount of cryptocurrency, or performance of a condition or obligation of a blockchain contract. On completion of the blockchain transaction, a party monitoring the blockchain network will be able to detect the completion of the blockchain transaction.

At step 230, the email authorization system selects, for a particular email source in the registry of email sources, a number of recipient email accounts from the registry of recipient email accounts. In one embodiment, the email source may specify a cold email delivery frequency (e.g., one-time, daily, weekly, etc.) and the email authorization system selects the plurality of recipient email accounts at the specified frequency. In one embodiment, the particular email source may specify a token budget, and the recipient email accounts are selected from the registry of recipient email accounts such that the email authorization system does not require more tokens than the amount specified in the token budget to validate cold email sent to the selected recipient email accounts. In one embodiment, the particular email source may specify a token budget per recipient email account and the recipient email accounts are selected from the registry of recipient email accounts such that none of the selected recipient email accounts require more tokens than the amount specified in the token budget per recipient email account to validate cold email sent to said recipient email account.

At step 240, the email authorization system, for each of the selected recipient email accounts, executes a blockchain transaction to validate the cold email that will be sent to the particular recipient email account on behalf of the email source. In one embodiment, a blockchain address is created and a blockchain transaction is executed using the blockchain address and the blockchain address of the particular email source. The email authorization system may determine a blockchain address associated with the recipient email account or email address. The blockchain transaction involves causing the blockchain network to add a record in the blockchain ledger that includes the specified characteristics required for validation of the cold email, such as a transfer of a predetermined type of token from the email source to the recipient, transfer of a specified amount of cryptocurrency, or performance of a condition or obligation of a blockchain contract. On completion of the blockchain transaction, a party monitoring the blockchain network will be able to detect the completion of the blockchain transaction. The email authorization system validates the particular selected email by executing the blockchain transaction associated with the blockchain address created for the selected email message, and the executed transaction is recorded in a blockchain ledger in a blockchain network. The blockchain transaction is broadcasted to a blockchain network, specifying the blockchain address and the characteristics of the transaction, such as an amount of cryptocurrency that has been transferred. In another embodiment, records of accounts associated with the recipient email accounts may be maintained, and an off-chain transaction may be executed. The off-chain transaction includes linking the blockchain address and encryption keys of the particular email source to the record of account to the recipient email account.

An off-chain transaction is a transaction that is locally processed by a wallet service, for example, and not recorded on a blockchain network. The senders (i.e., the email sources) and receivers (i.e., the recipient email account receiving cold email) use a wallet service as a trusted third party to record and guarantee the transaction. While a blockchain transaction depends on the blockchain network to determine its validity, an off-chain transaction relies on other methods to record and validate the transaction, such as a payment channel implementing Hashed Timelock Contracts, Sidechains, etc. Senders and receivers of tokens in an off-chain transaction must agree to accept the particular method by which the transaction occurs. Off-chain transactions allow for more immediate transfer of tokens between two parties, without delays or unavoidable transaction fees of validating transactions by the blockchain network. During an off-chain transaction, blockchain addresses and private/public keys associated with the transaction are linked to the receiver. In one embodiment, "linking" blockchain addresses and keys includes assigning the blockchain addresses and encryption keys to the receiver. In one embodiment, "linking" blockchain addresses and keys includes giving the receiver effective access to the blockchain addresses and encryption keys. In another embodiment, "linking" blockchain addresses and keys includes notifying the trusted third party of the reassignment of the blockchain addresses and keys to the receiver. Digital wallets such as Coinbase™ allow off-chain transactions between various users within its system. Off-chain channels, such as Lightning Network™ and Raiden Network™, also allow off-chain transactions between various users by creating a relationship between the users, and updating token balances after transactions without broadcasting to the blockchain network.

At step 250, the email authorization system generates cold email to be sent to the email addresses associated with the recipient email accounts selected at step 240. The email authorization system includes authorization tags in the generated cold email messages, the authorization tags having the capability of bypassing the filters associated with the selected recipient email accounts. In one embodiment, the authorization flag may be a part of the message body of the cold email messages. In one embodiment, the authorization body may be a part of one of the components of the header of the cold email messages, such as the delivery parameters, sender email address, email address domain, IP address from which the email originated, etc.

In some embodiments, the email authorization system may execute the procedure described with reference to FIG. 1, in which case a cold email in a recipient email inbox from a particular email source may be marked as unauthorized if the email source has sent more than a predetermined number of cold email messages to the recipient email account. The email authorization system can detect in this case the number of authorized cold email messages previously sent.

At step 260, the email authorization system enables the delivery of the generated cold email to the email inbox folder of the recipient email accounts. In one embodiment, the email authorization system may deliver the cold email to the email inbox folder of the recipient. In another embodiment, the email authorization system may authorize the email server associated with the email source to forward the email to the email inbox folder of the recipient.

The processes of FIG. 1 and/or FIG. 2 can be implemented using a computer system storing computer software for execution which has access to the email channels of registered email accounts. The network node can be implemented on a machine coupled to the Internet including, in some embodiments, the same machine as is used by email recipients, and in other embodiments, a cloud-based server, and in other embodiments, any point of presence on a network connected to the Internet.

The computer software implementing the process of FIG. 1 and/or FIG. 2 can be stored in computer-readable memory, or other non-transitory data storage medium, for the purposes of distribution to machines to execute the procedures, or for access by a processor or processors executing the procedure.

System Overview

Figure 3:
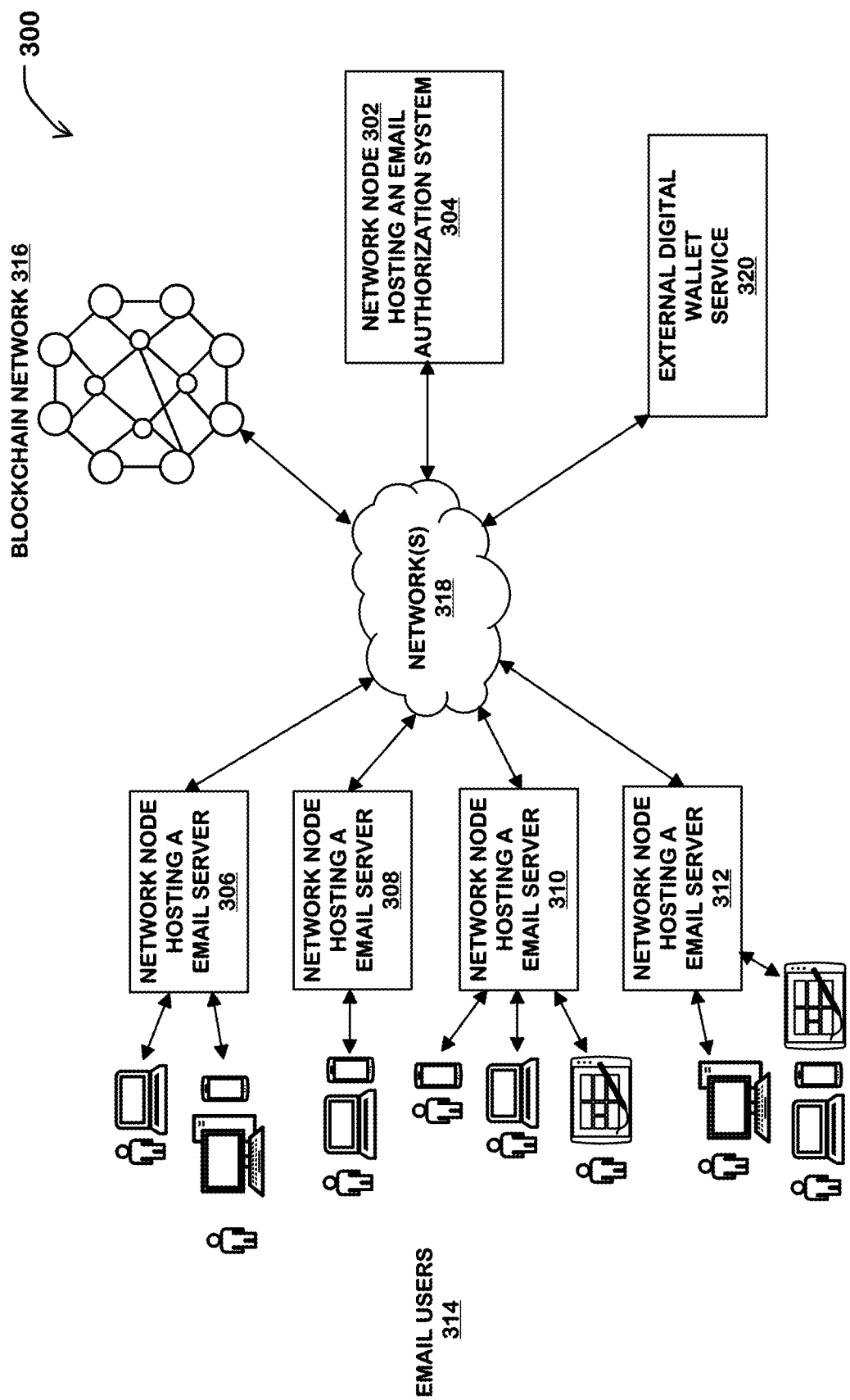
FIG. 3 illustrates an architectural level schematic of an environment that includes an email authorization system in accordance with an implementation.

FIG. 3 illustrates an architectural level schematic of an environment in which an email authorization system executing procedures like that of FIG. 1 and FIG. 2 is deployed in a network node 302 on the network. As FIG. 3 is an architectural diagram, certain details are intentionally omitted to improve the clarity of the description. The discussion of FIG. 3 will be organized as follows. First, the elements of the figure will be described, followed by their interconnections.

The system 300 includes network nodes hosting email servers 306, 308, 310 and 312, the network(s) 318, a blockchain network 316, an external wallet service 320, and a network node 302 hosting an email authorization system 304. As used herein, a network node is an active electronic device or virtual device that is attached to a network, and is capable of sending, receiving, or forwarding information over a communications channel. Examples of electronic devices which can be deployed as network nodes include all varieties of computers, workstations, laptop computers, handheld computers, and smartphones. Network nodes can be implemented in a cloud-based server system. More than one virtual device configured as a network node can be implemented using a single physical device. For the sake of clarity, only four network nodes hosting email servers and one external wallet service are shown to be connected to the network node 302 hosting an email authorization system 304 through the network(s) 318. However, any number of network nodes hosting email servers and external wallet services can be connected to the network node 302 hosting an email authorization system 304 through the network(s) 318.

The interconnection of the elements of system 300 will now be described. Network(s) 318 couples the network nodes hosting email servers 306, 308, 310 and 312, the blockchain network 316, the external wallet service 320, and the network node 302 hosting the email authorization system 304, all in communication with each other (indicated by solid double-arrowed lines). Email users 314 are connected to the network node 302 hosting the email authorization system 304 through network nodes hosting email servers 306, 308, 310 and 312. Each email user has an email account on their respective email server. In some embodiments, email users 314 may include one or more individuals who utilize the functionality of an email authorization system to identify genuine cold email. Various computer software that can be used to run an email server includes Novell Groupwise™, Lotus Notes™, Microsoft Exchange Servers™, Sendmail™, Postfix™, and Exim™. A web-based email platform, such as Gmail™, Hotmail™, or Yahoo! Mail™ can also be used. In the technology described herein, network nodes hosting email servers 306, 308, 310 and 312 can use any of the platforms described. Users 314 can access their email through many devices including in some examples the following devices: a smartphone, a personal computing (PC) device such as a desktop or laptop computer, a media center device or other PC derivative, portable media consumption device (mobile terminal, personal digital assistant (PDA), gaming and/or media console, etc.), a tablet computer, other consumer electronic device, or the like.

An email channel from an email server to an email client can be executed according to an email protocol like Internet Message Access Protocol IMAP, Post Office Protocol—Version 3 POP3 (other versions) and HTTP for web-based email interfaces. See, Crispin, "Internet Message Access Protocol—Version 4rev1", RFC 3501, March 2003; Myers, "Post Office Protocol—Version 3," RFC 1939, May 1996. An email channel between email servers acting as message transfer agents can be executed according to a protocol such as Simple Mail Transfer Protocol (SMTP). See, Klensin, J., "Simple Mail Transfer Protocol," RFC 5321, DOI 10.17487/RFC5321, October 2008, <http://www.rfc-editor.org/info/rfc5321>, which is incorporated herein by reference. Alternatives, such as proprietary email servers, can execute different protocols to carry email on an email channel to an email recipient. In addition to protocols, email clients can access email servers via application programming interfaces (APIs).

The actual communication path through the Internet can be point-to-point over public and/or private networks. The communications can occur over a variety of networks 318, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The blockchain network 316 is a distributed and public ledger which maintains records of all the blockchain transactions on the blockchain. In some embodiments, the blockchain network is a peer-to-peer network and does not require a central authority or trusted intermediaries to authenticate or to settle the transactions or control the underlying infrastructure. Examples of popular blockchain platforms include Ethereum™, Eris™, MultiChain™, Bitcoin™, Hyperledger Fabric™, and Hyperledger Corda™.

Users 314 can maintain a cryptocurrency balance and send or receive cryptocurrency through the external wallet service 320. Examples of popular wallets include Coinbase™, Bread Wallet™, Mycelium™, Exodus™, Copay™, Jaxx™ Armory™, Trezor™, Ledger Nano™, Green Address™, and Blockchain.info™.

Figure 4:
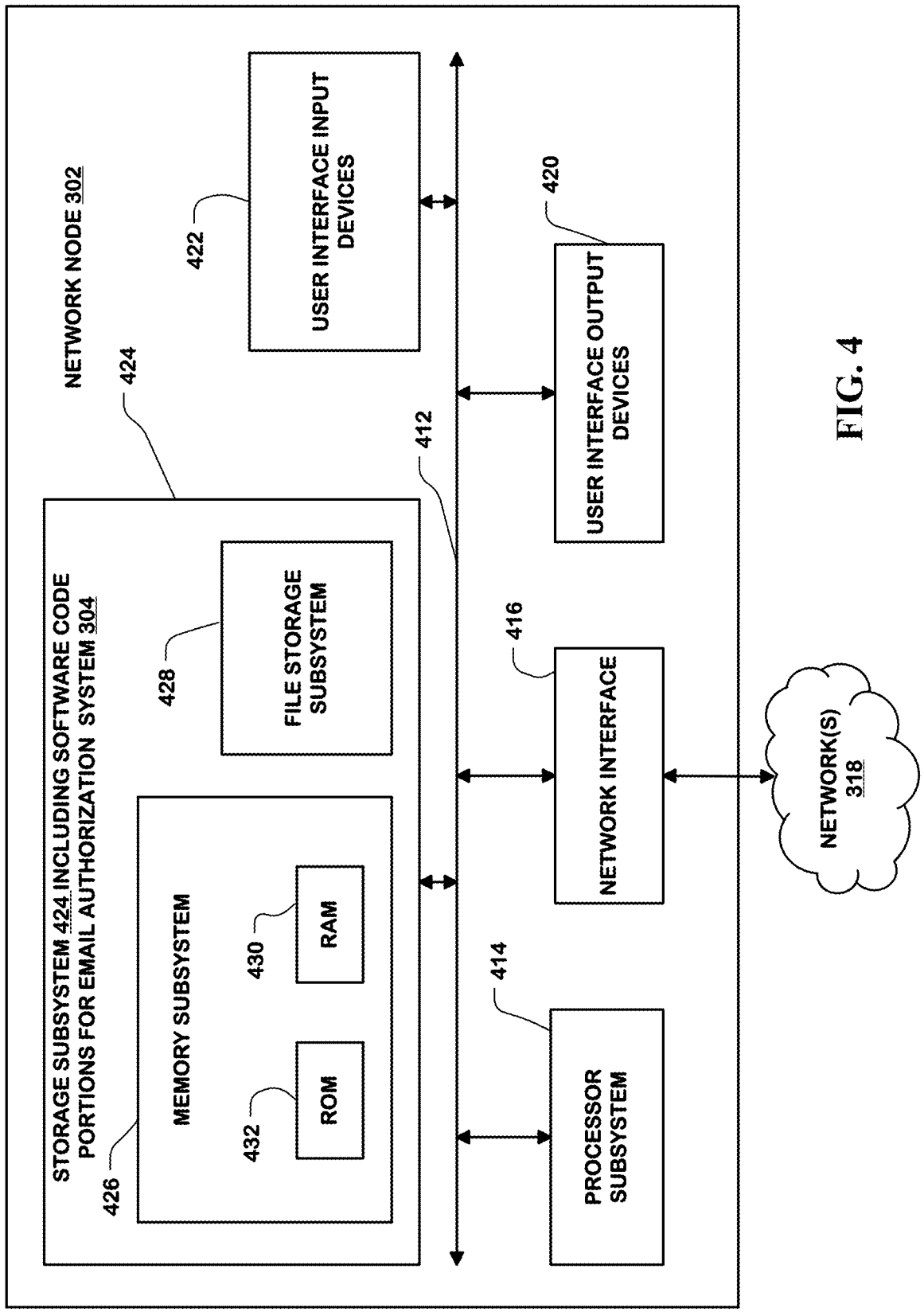
FIG. 4 is a simplified block diagram of a network node hosting an email authorization system.

The network node 302 hosts an email authorization system 304. FIG. 4 is a simplified block diagram of a network node that can be used to implement email authorization system 304. Network node 302 typically includes an operating system executed by a processor subsystem 414 which communicates with a number of peripheral devices via bus subsystem 412. These peripheral devices may include a storage subsystem 424, comprising a memory subsystem 426 and a file storage subsystem 428, user interface input devices 422, user interface output devices 420, and a network interface subsystem 416. The input and output devices allow user interaction with network node 302. Network interface subsystem 416 provides an interface to outside network 318 and is coupled via network 318 to other elements in system 300. The physical hardware components of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system.

User interface input devices 422 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 302 or onto network 318.

User interface output devices 420 may include a display subsystem, a printer, a fax machine, or nonvisual displays such as audio output devices. The display subsystem may include a cathode ray tube (CRT), a flat-panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node 302 to the user or to another machine or network node. In particular, an output device of the network node 302 on which email authorization system 304 is implemented, may include a visual output informing a user of action recommendations made by the system, or may include a communication device for communicating action signals.

Storage subsystem 424 stores the basic programming and data constructs that provide the functionality of certain embodiments of the present invention. For example, the various modules implementing the functionality of certain embodiments of the invention may be stored in storage subsystem 424. These software modules are generally executed by processor subsystem 414.

Memory subsystem 426 typically includes a number of memories including a main random access memory (RAM) 430 for storage of instructions and data during program execution and a read-only memory (ROM) 432 in which fixed instructions are stored. File storage subsystem 428 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain embodiments of the invention may also be stored by file storage subsystem 428. The host memory subsystem 426 contains, among other things, computer instructions which, when executed by the processor subsystem 414, cause the computer system to operate or perform functions as described herein. As used herein, processes and software that are said to run in or on "the host", "the computer" or "the network", execute on the processor subsystem 414 in response to computer instructions and data in the host memory subsystem 426 including any other local or remote storage for such instructions and data.

Bus subsystem 412 provides a mechanism for letting the various components and subsystems of network node 302 communicate with each other as intended. Although bus subsystem 412 is shown schematically as a single bus, alternative embodiments of the bus subsystem may use multiple busses.

Network node 302 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of network node 302 depicted in FIG. 4 is intended only as a specific example for purposes of illustrating the preferred embodiments of the present invention. Many other configurations of network node 302 are possible having more or less components than the system depicted in FIG. 4.

In some embodiments, the email authorization system 304 can be implemented in the network node 302 as a Software-as-a-Service (SaaS) application, a web-architected application or a cloud-delivered service. Examples of common SaaS applications today include Salesforce.com™, Box™, Dropbox™, Google Apps™ Amazon Web Services AWS™, Microsoft Office 365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites. Note that a SaaS application can be supported by both web browser clients and application clients that use URL-based APIs (application programming interfaces).

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Email Authorization System

Figure 5:
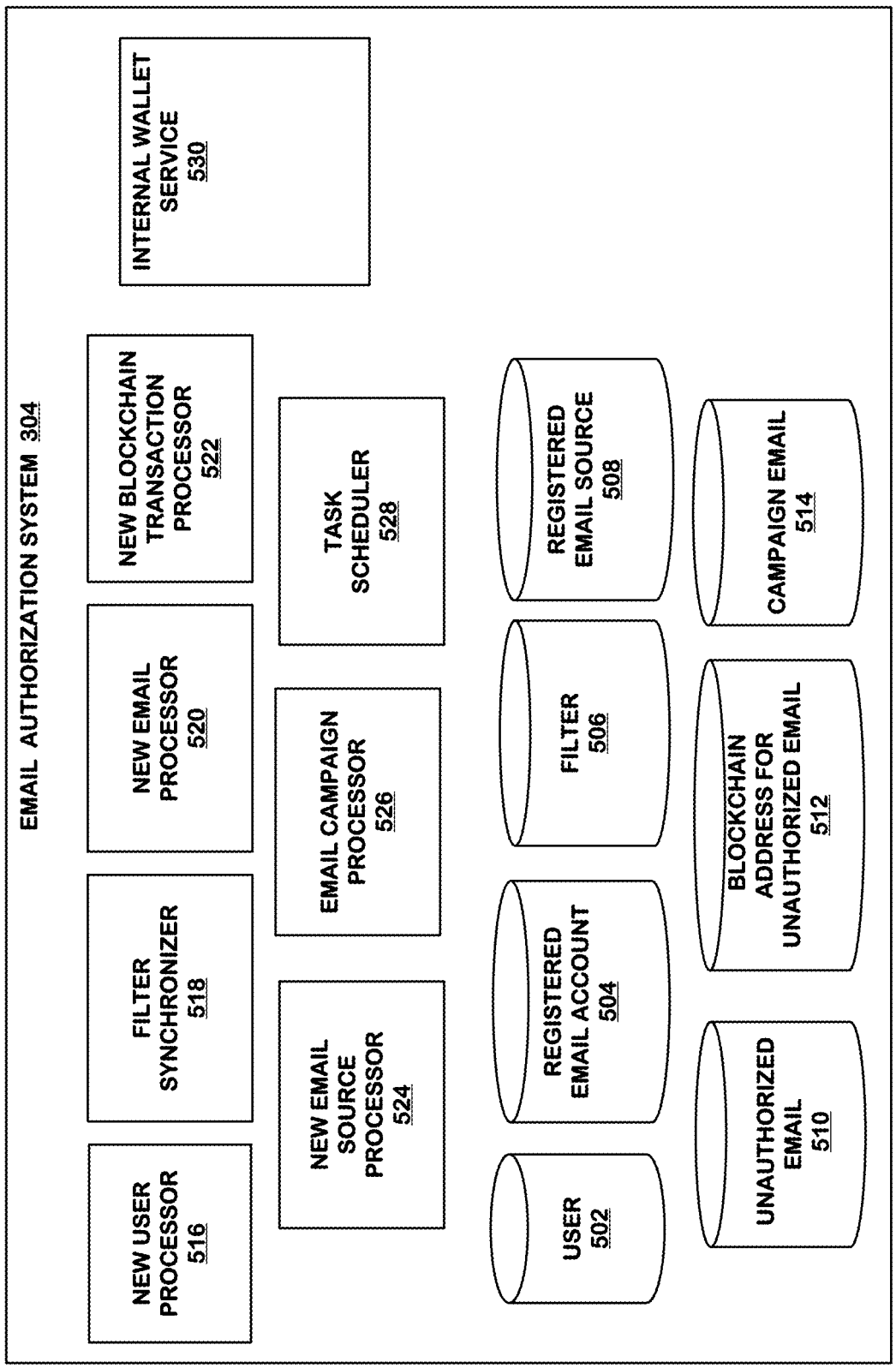
FIG. 5 illustrates an example of an email authorization system.

FIG. 5 illustrates an example of an email authorization system 304. The email authorization system 304 includes software components referred to herein as a new user processor 516, a filter synchronizer 518, a new email processor 520, a new blockchain transaction processor 522, a new email source receiver 524, an email campaign processor 526 and a task scheduler 528. These components can be distributed between nodes executing email servers and remote nodes in the network in some embodiments.

The new user processor 516 processes the sign-up process for registration of new email authorization system users to identify and enable monitoring of email channels of registered recipients in the system. The new email source processor 524 processes the sign-up process for registration of new email sources and email campaigns for sending cold email to the registered email authorization system users. The filter synchronizer 518 maintains the filter used for classifying email messages as unauthorized, such as by executing a routine that periodically checks for new contacts in a user contact list and email history to be added to a user filter. The new email processor 520 periodically traverses email channels of registered recipients, and classifies new email using a filter, creates blockchain addresses for each selected email, and causes the sending of a message to the senders of the selected email messages prompting the senders to gain authorization for the selected email messages by executing blockchain transactions. The new email processor 520 also periodically traverses email channels of email authorization system users, and identifies email with authorization tags from registered email sources. The new blockchain transaction processor 522 periodically checks for new blockchain transactions in the blockchain network 316, verifies that the blockchain transaction satisfies the requirements of the prompted transaction and identifies the selected email as authorized, enabling for example, moving them to user inboxes if the blocked transactions are verified. The email campaign processors 526 select a plurality of registered email authorization users for a registered email source and deliver cold email with authorization tags to the selected users on behalf of the email source. The task scheduler 528 schedules various tasks in the email authorization system 304, such as requesting the filter synchronizer 518 to check for new contacts in user contact lists and email history, requesting the new email processor 520 to check for new email, requesting the new blockchain transaction processor 522 to check for new blockchain transactions in the blockchain network 316, and requesting the email campaign processor 526 to distribute cold email to users on behalf of registered email sources. In some embodiments, the email authorization system 304 may also host an internal wallet service 530 for email authorization system users and email sources who wish to store their cryptocurrency balance using the email authorization system 304.

The email authorization system also includes a user database 502, a registered email account database 504, a filter database 506, a registered email source database 508, an unauthorized email database 510 storing email tagged as unauthorized, a blockchain address for unauthorized email database 512, and a campaign email database 514 storing cold email sent by email sources. As used herein, the term "database" does not necessarily imply any unity of structure. For example, two or more separate databases, when considered together, still constitute a "database" as that term is used herein. Databases can include tables. In some embodiments, the user and registered email account data are stored in separate tables within a single database.

Figure 6:
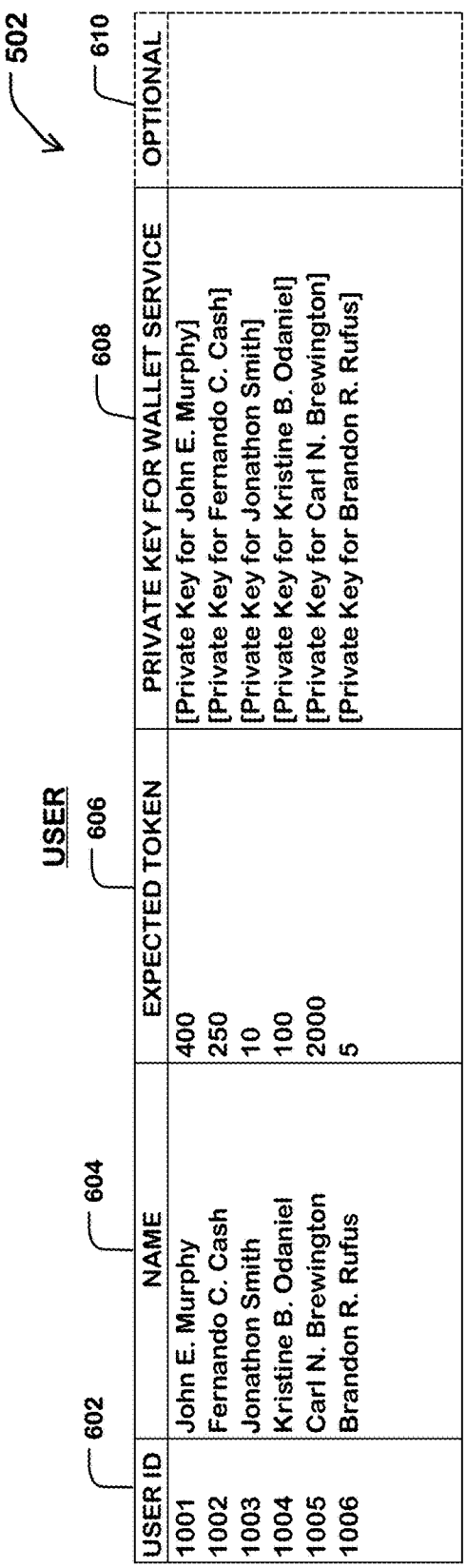
FIG. 6 is a symbolic drawing indicating how the user database in FIG. 5 is organized, according to an embodiment of the invention.

FIG. 6 is a symbolic drawing indicating how the user database 502 in FIG. 5 can be organized, according to an embodiment. The user database 502 contains information regarding the email authorization system users. The user database 502 includes a unique user ID 602 for each user, user name 604, and a parameter (expected token) 606 specifying a characteristic of a blockchain transaction, such as a number or type of token or cryptocurrency value, which must be satisfied for authorization of a cold email for the recipient. In some embodiments, the user database 502 can have separate entries for the first name and surname of the user. As shown in FIG. 6, an example of user entries include user John E. Murphy with user ID 1001 who expects 400 tokens to respond to an email from an unknown sender, user Kristine B. Odaniel with user ID 1004 who expects 100 tokens to respond to an email from an unknown sender, and user Carl N. Brewington with user ID 1005 who expects 2000 tokens to respond to an email from an unknown sender. In some embodiments, a characteristic such as an expected cryptocurrency value or token type or amount (expected token) 606 is set by the user. In some embodiments, the expected characteristic (expected token) 606 is a default set by the email authorization system. In some embodiments, the characteristic (expected token) 606 is adjusted based on the email traffic for the user, or another factor which can, for example, indicate demand for the given recipient. In some embodiments, the user database 502 can include the private keys of any external wallet service/internal wallet 608, e.g., John E. Murphy with user ID 1001 and Carl N. Brewington with user ID 1005. In some embodiments, the user database 502 may include other optional user information 610 that might be helpful for the functionality of the email authorization system 304, e.g., the password for the user account, the timestamp of last sign in, the timestamp for user account creation, user organization, profile picture, and so on.

Figure 7:
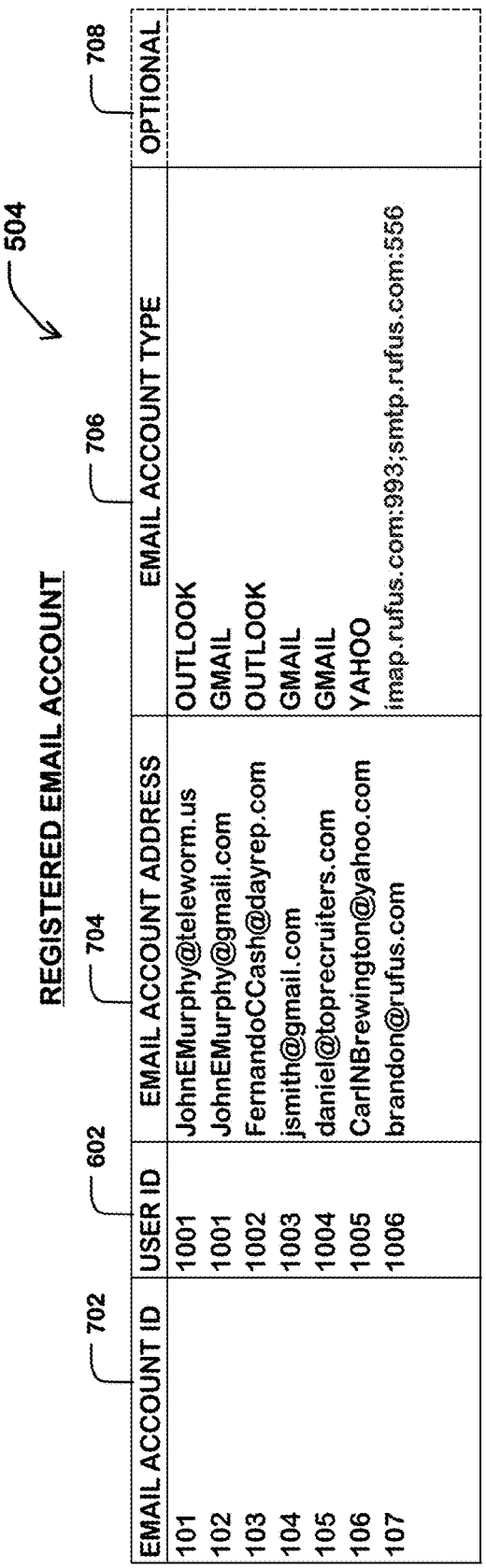
FIG. 7 is a symbolic drawing indicating how the registered email account database in FIG. 5 is organized, according to an embodiment of the invention.

FIG. 7 is a symbolic drawing indicating how the registered email account database 504 in FIG. 5 may be organized, according to an embodiment. The registered email account database 504 contains information regarding the email accounts the email authorization system has permission to access for the purpose of executing the authorization service. The registered email account database 504 includes a unique email account ID 702 for each email account. The owner of the email account is identified by the user ID 602 of the owner. The registered email account database 504 further includes a registered email address 704 associated with the email account, and an email account type 706. The email account type 706 specifies the email platform used by the email server hosting the email account. Example email platforms include Novell Groupwise™, Lotus Notes™, Microsoft Exchange Servers™, Sendmail™, Postfix™, Exim™, Gmail™, Hotmail™, and Yahoo! Mail™. In some embodiments, a user may have information for one registered email account, e.g., user Kristine B. Odaniel with user ID 1004 with one email account with email account ID 105 and email address daniel@toprecruiters.com on a Gmail™ email platform, and user Carl N. Brewington with user ID 1005 with one email account with email account ID 106 and email address CarlNBrewington@yahoo.com on a Yahoo! Mail™ email platform. In some embodiments, a user may have information for two or more registered email accounts, e.g., user John E. Murphy with user ID 1001 with one email account with email account ID 101 and email address JohnEMurphy@teleworm.us on a Outlook™ email platform, and one email account with email account ID 102 with email address JohnEMurphy@gmail on a Gmail™ email platform. In some embodiments, the user email account might be hosted on an unconventional email platform; for such email accounts, Internet Message Access Protocol (IMAP) and SMTP URLs are stored. In some embodiments, the registered email account database 504 may further include other optional information 708 that might be helpful for the functionality of the email authorization system 304, e.g., last time contact list from the particular email account was synched with the user filter, timestamp for account creation, last time account was updated and so on.

FIG. 8 is a symbolic drawing indicating how the filter database 506 in FIG. 5 may be organized, according to an embodiment. The filter database 506 contains information regarding a user filter for each user in the email authorization system 304. A user filter is composed using identifying parameters associated with email. The identifying parameters can include components in an email message header, e.g., sender email address, email address domain, IP address from which the email originated, etc. In some embodiments, a user filter can be composed of email addresses, domains already included in the user contact list in the user email account. Email from the known contacts in the filter database 506 can be automatically forwarded to the user email inboxes. The filter database 506 includes allowed email address 802 for a user identified by user ID 602. In some embodiments, a user may also include certain domains, e.g., user Kristine B. Odaniel with user ID 1004 allows any email from the domain yahoo.com. In some embodiments, any information in an email message header can be included in a user filter in the filter database 506. In some embodiments, the filter database 506 may further include other optional information 804 that might be helpful for the functionality of the email authorization system 304, e.g., timestamp for when the filter entry was created, timestamp for when the filter entry was last updated, whether the filtered member has been notified by email of inclusion in the user filter, and so on.

FIG. 9 is a symbolic drawing indicating how the registered email source database 508 in FIG. 5 may be organized, according to an embodiment. The registered email source database 508 contains information regarding registered email sources and email campaigns that will be run by the email authorization system 304 on behalf of the email sources. The registered email source database 508 includes a unique email source ID 901 for each email source, email source name, email source or domain 902, the content or message body of the cold email 904, the frequency 906 at which the cold email will be delivered by the email authorization system 304 (e.g., one-time, daily, weekly, bi-weekly, monthly, etc.), and a maximum token budget 908 allowed by the email source to validate cold email. In some embodiments, the maximum token budget 908 may be the maximum token that may be used for the entire duration of the email campaign. In some embodiments, the maximum token budget 908 may be the maximum token that may be used daily. The token budgets may be a predetermined type of token from the sender of the selected email to the recipient, characteristics of the email campaigns, transfer of a specified amount of cryptocurrency, or performance of a condition or obligation of a blockchain contract. In some embodiments, registered email source database 508 may further include the maximum token budget to be spent for one cold email recipient 910. In some embodiments, the registered email source database 508 may further include other optional information 912 that might be helpful for the functionality of the email authorization system 304, e.g., the timestamp for when the registered email source entry was created, the timestamp for when the registered email source entry was last updated and so on.

FIG. 10 is a symbolic drawing indicating how the unauthorized email database 510 in FIG. 5 is organized, according to an embodiment of the invention. The unauthorized email database 510 contains information regarding tagged, unauthorized email from the registered email accounts of the users. The unauthorized email database 510 identifies each unauthorized email with an email ID 1002. The unauthorized email database 510 further includes the email subject 1004, the email account ID 702 of the registered email account from which the email authorization system retrieved the email, the email sender address 1006, the current folder 1008 in which the unauthorized email resides on the originating email server, and whether the blockchain transaction (token) has been received 1010 and verified, that is required to release the blocked, unauthorized email. In some embodiments, blocked, unauthorized email is kept in an "unauthorized" folder (alternatively labeled "unpaid" folder when the blockchain transaction includes a transfer of cryptocurrency) at the email server end. In some embodiments, the unauthorized email database 510 may further include other optional information 1012 that might be helpful for the functionality of the email authorization system 304, e.g., timestamp for when the email entry was created, timestamp for when the email entry was last updated, whether the message prompting the sender to authenticate the email has been delivered, and so on. As shown in FIG. 10, spam email such as the email with the subject "GET PAID $500/hr" with email ID 1 and the email with subject "*FREE VACATION*" with email ID 3 are rarely authenticated by their senders, and the email authorization system 304 does not authorize their release to the recipient email inbox. However, genuine cold email such as the email with the subject "Invitation to join ACM Artificial Intelligence Committee" with email ID 4 have been validated by the sender with the email address "ProfDoLittle@cs.umn.edu," and the email authorization system 304 has authorized its release to the recipient email inbox.

FIG. 11 is a symbolic drawing indicating how the blockchain address for unauthorized email database 512 in FIG. 5 is organized, according to an embodiment of the invention. The blockchain address for unauthorized email database 512 includes the email ID 1002 for each unauthorized email, the email blockchain address 1102 being created by the email authorization system 304, and whether a blockchain transaction with the corresponding blockchain address has been made 1104. In some embodiments, the blockchain address for unauthorized email database 512 may further include other optional information 1106 that might be helpful for the functionality of the email authorization system 304.

FIG. 12 is a symbolic drawing indicating how the campaign email database 514 in FIG. 5 is organized, according to an embodiment of the invention. The campaign email database 514 contains information regarding cold email sent by the email authorization system on behalf of registered email sources to various registered email accounts. The campaign email database 514 identifies each instance or payload of a cold email with an email ID 1202. The campaign email database 514 further includes the ID of the recipient email account source ID 901 receiving the cold email, the email account ID 702 of the registered email source sending the cold email through the email authorization system, the blockchain address 1204 of the executed blockchain transaction to validate the cold email, a parameter (expected token) 1206 specifying a characteristic of the blockchain transaction, such as a number or type of token or cryptocurrency value, which is rewarded to the recipient to authorize the cold email to be included in the recipient email account inbox, and status 1208 of the cold email (e.g., sent, delivered to inbox, etc.). In some embodiments, the cold email database 514 may further include other optional information 1210 that might be helpful for the functionality of the email authorization system 304, e.g., the timestamp for when the cold email entry was created, the timestamp for when the cold email entry was last updated, and so on. As shown in FIG. 12, the cold email with the email ID 1 has been sent to the recipient email account with ID 104 by the email source 1004 and has been validated by the email authorization system 304 through the execution of a blockchain transaction. The cold email has been delivered to the email inbox folder of the recipient. Recipient email account with ID 107 has been sent two cold email messages with IDs 3 and 4 by the email source with ID 1004. The cold email with ID 3 has been delivered to the recipient email inbox folder while the cold email with ID 4 has not been delivered.

Figure 14:
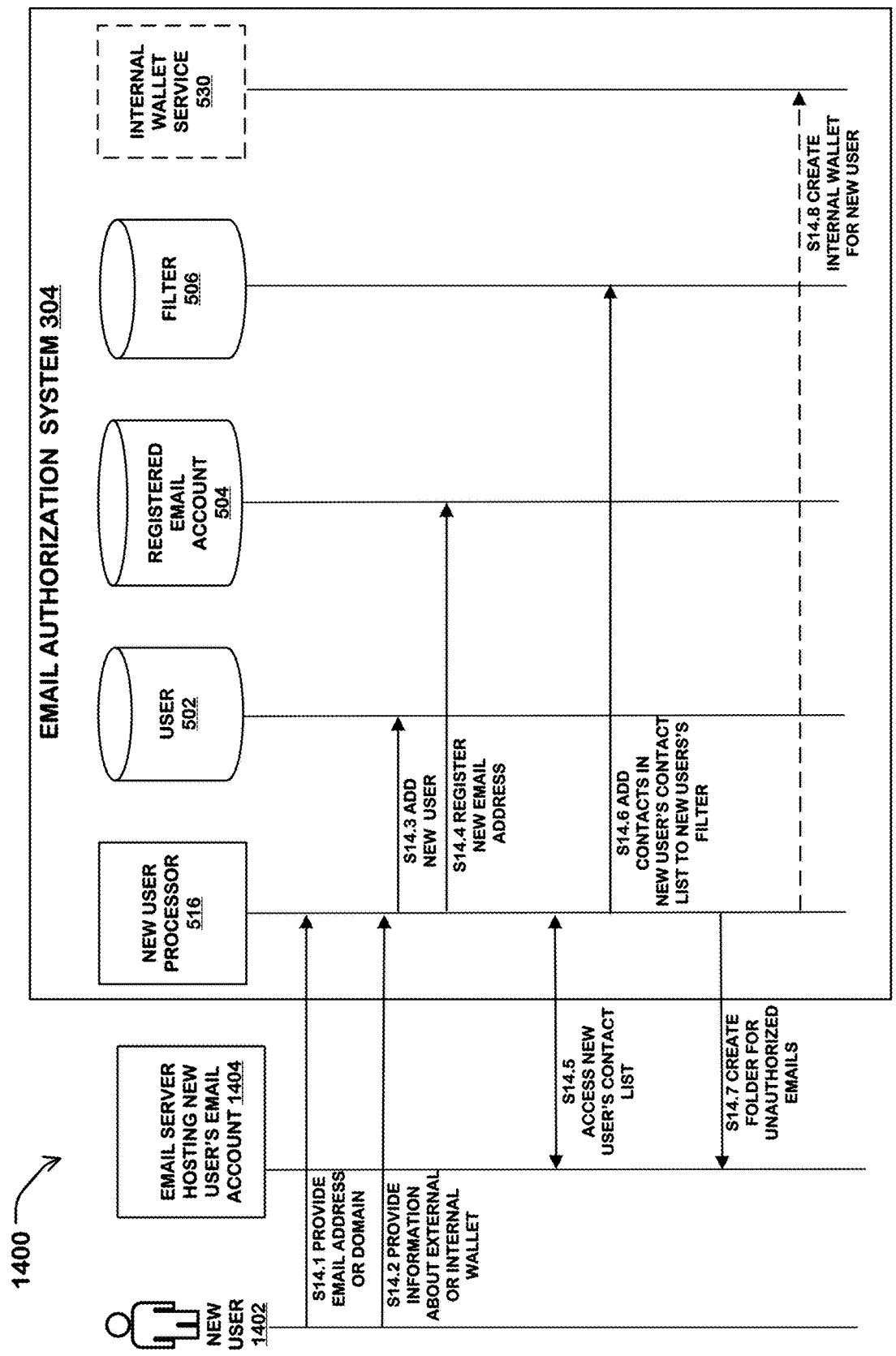
FIG. 14 is a sequence diagram illustrating a representative method of processing a new user in the email authorization system by the new user processor in FIG. 5.

FIG. 14 is a symbolic drawing indicating how the internal wallet service 530 in FIG. 5 is organized, according to an embodiment of the invention. The internal wallet service 530 maintains a record of blockchain transactions and other transactions associated with blockchain transactions for users of the email authorization system internal wallet service. Each transaction is associated with a user ID 602, a blockchain address 1304, the private key(s) 1306 associated with the blockchain address 1304 and the token amount 1302 involved in the transaction. When a transaction is executed, the blockchain address 1304 associated with the transaction and corresponding encryption private keys 1306 of the blockchain address is recorded in the internal wallet service 530. The cryptocurrency balance of each user using the service of the internal wallet service 530 can be determined by summing up the tokens in transactions associated with the user email account ID 702. In some embodiments, the internal wallet service 530 may further include other optional information 1308 that might be helpful for the functionality of the email authorization system 304. As shown in FIG. 14, user ID 1007 has deposited 500 tokens in the internal wallet service 530 by executing a blockchain transaction associated with the blockchain address NcuCb-HEf3 W. Other than the internal wallet service 530 of the email authorization system 304, private keys can be stored in desktop wallets (wallet service available on that particular machine the wallet service has been installed), cloud wallets (wallet service hosted by a third party), mobile wallets (any wallet that exists on a device that will ever connect to the Internet), hardware wallets (physical devices), paper wallets (printing out the private keys on a piece of paper which will then be stored in a secure place).

Sign Up Process for a New Email Authorization System User

FIG. 14 is an example workflow 1400 illustrating a representative method of registering a new user by a new user processor in the email authorization system 304 by the new user processor 516 in FIG. 5. In some embodiments, the actions in the workflow may be performed in different orders and with different, fewer or additional actions than those illustrated in FIG. 14. Multiple actions can be combined in some implementations.

FIG. 14 includes workflow 1400 that begins at step S14.1. A new user 1402 signs up by providing an email account, and the email server information associated with the email account to the new user processor 516 in the email authorization system 304. In some embodiments, the email authorization system 304 will be able to detect the email server information automatically by the email address provided by the new user 1402. In some embodiments, the new user 1402 may provide information about more than one email account.

Workflow 1400 continues at step S14.2, the new user 1402 provides information about an external wallet to the new user processor 516 in the email authorization system 304, or the user might submit a request for an account in the internal wallet of the email authorization system. At step S14.3, the new user processor 516 adds the new user 1402 information to the user database 502. At step S14.4, the new user processor 516 adds the email account(s) information of the new user 1402 to the registered email account database 504. At step S14.5, the new user processor 516 accesses the email server 1404 hosting the new user email account for the new user contact list. At step S14.6, the new user processor 516 adds the contacts and domains in the new user contact list to the user filter in the filter database 506. The added filter database entries can be identified by the user ID of the new user. At step S14.7, the new user processor 516 creates a folder for authorized email in the new user email account hosted in email server 1404. At step S14.8, if requested by the new user 1402, the new user processor 516 creates an internal wallet account for the new user 1402 in the internal wallet service 530.

Filter Synchronization

Figure 15:
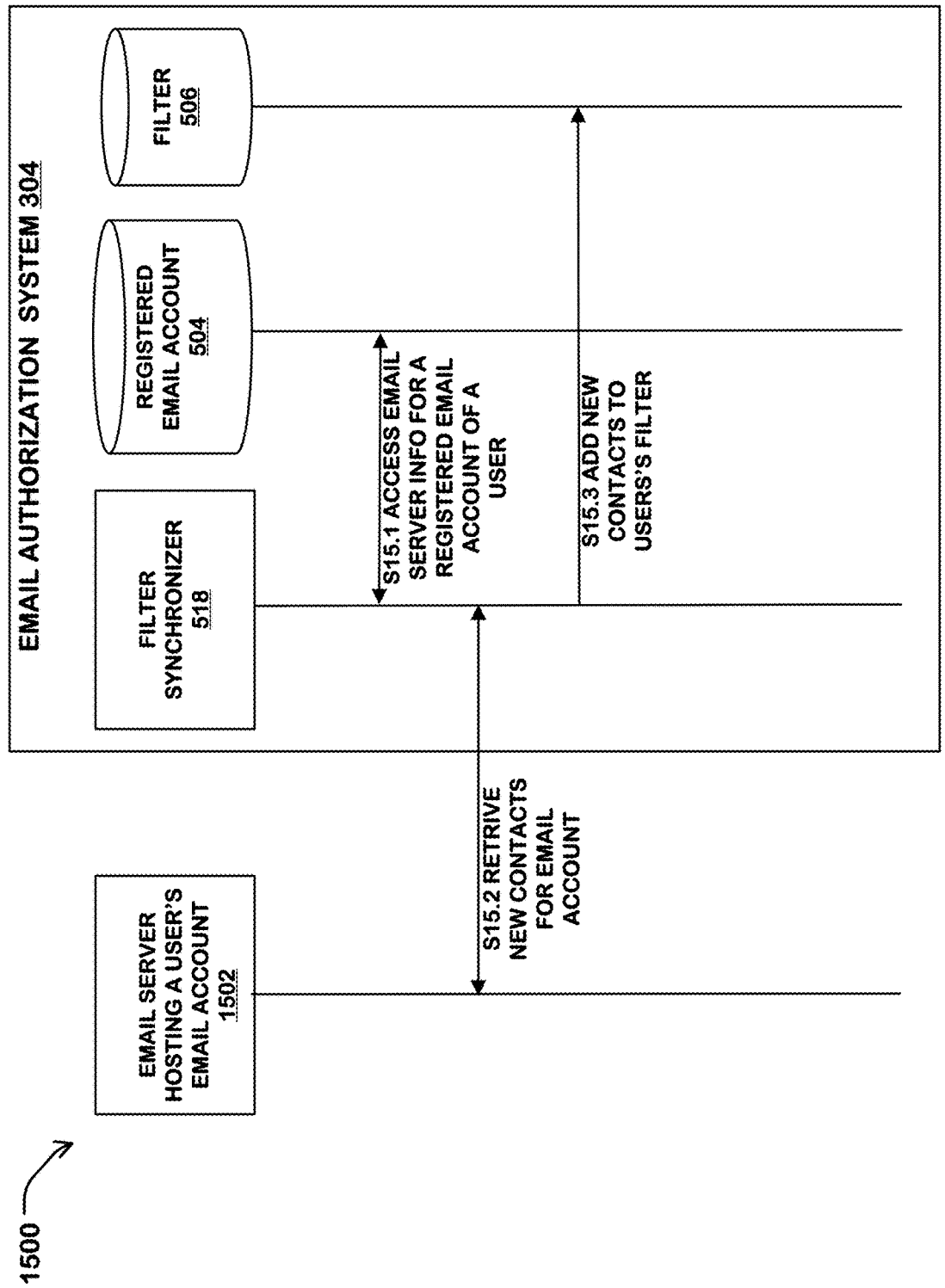
FIG. 15 is a sequence diagram illustrating a representative method of synching a user filter with a users' contact lists by the filter synchronizer in FIG. 5.

FIG. 15 is an example workflow 1500 illustrating a representative method of synching a user filter in the filter database 506 with user contact lists located in the user email account by the filter synchronizer 518 in FIG. 5. In some embodiments, the actions in the workflow may be performed in different orders and/or with different, fewer or additional actions than those illustrated in FIG. 15. Multiple actions can be combined in some implementations.

FIG. 15 includes workflow 1500 that begins at step S15.1 where the filter synchronizer 518 in the email authorization system 304 accesses the registered email account database 504 to access email account and server information for a registered user email account in the registered email account database 504. Workflow 1500 continues at step S15.2 where the filter synchronizer 518 retrieves information about new contacts from a user contact list and email history on the email server 1502 hosting the user email account. At step S15.3, the filter synchronizer 518 adds the newly retrieved contacts from the user contact list to the user filter in the filter database 506. The added entries in the filter database 506 can be identified by the user ID of the owner of the email account.

Sign Up Process for a New Email Source

Figure 16:
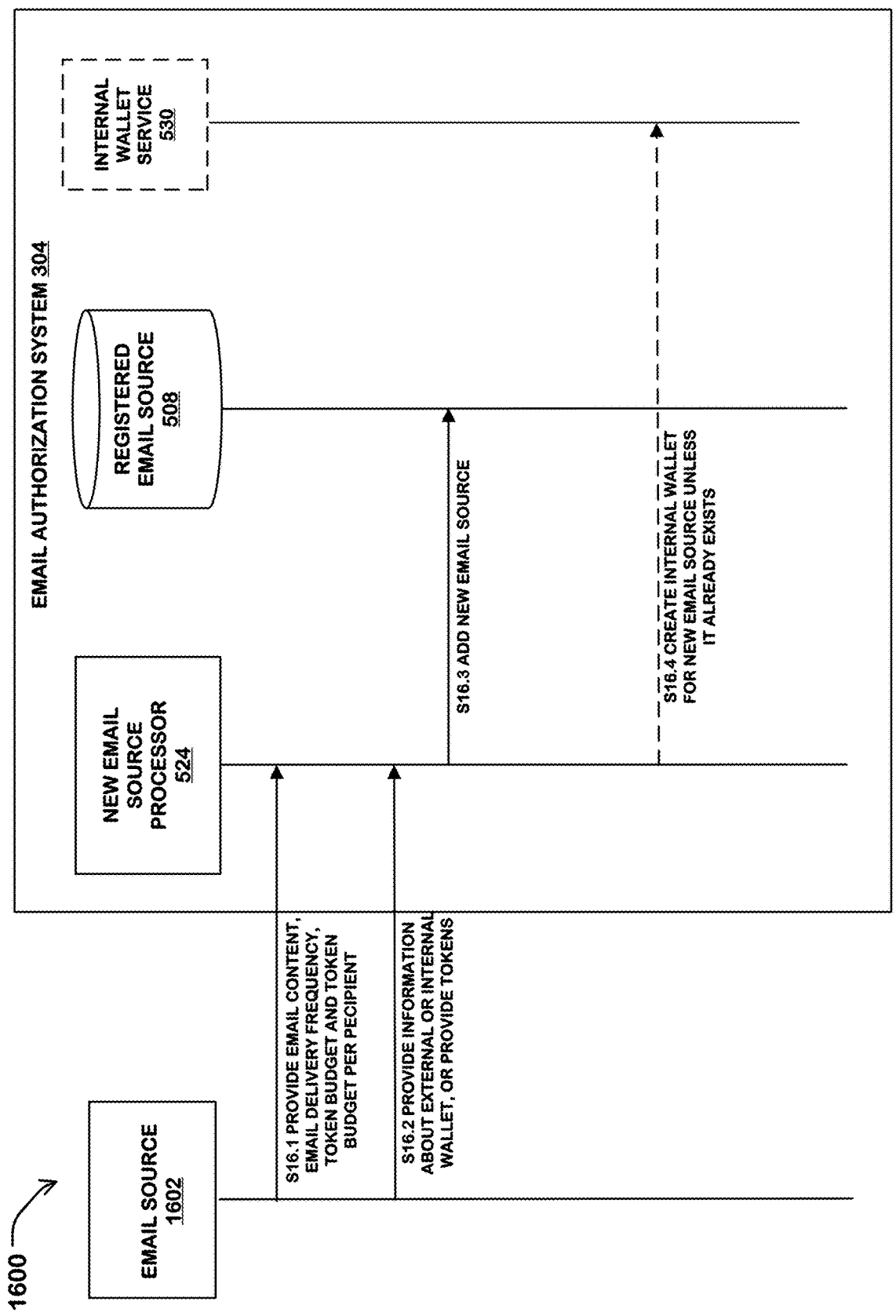
FIG. 16 is a sequence diagram illustrating a representative method of processing a new email source in the email authorization system by the new email source processor in FIG. 5.

FIG. 16 is an example workflow 1600 illustrating a representative method of registering a new email source in the email authorization system 304 by the new email source processor 524 in FIG. 5. In some embodiments, the actions in the workflow may be performed in different orders and with different, fewer or additional actions than those illustrated in FIG. 16. Multiple actions can be combined in some implementations.

FIG. 16 includes workflow 1600 that begins at step S16.1, when a new email source 1602 signs up for a cold email campaign by providing the content for a cold email, the email delivery frequency, token budget for the cold email campaign and/or token budget per recipient to the new email source processor 524 in the email authorization system 304. In some embodiments, the new email source 1602 may provide information about more than one cold email campaign.

Workflow 1600 continues at step S16.2 where the new email source 1602 provides information about an external wallet to the new email source processor 524 in the email authorization system 304, the email source might submit a request for an account in the email authorization system internal wallet or the email source may supply the email authorization system a token amount for the cold email campaign. At step S16.3, the new email source processor 524 adds the email source, identifying the email source as a genuine cold email sender, and the requested cold email campaign in the registered email source database 508. At step S16.4, if requested by the new email source 1602, the new email source processor 524 creates an internal wallet account for the new email source 1602 in the internal wallet service 530. In some embodiments, the new email source may already have an account in the internal wallet service 530.

Processing of Cold Email Campaigns

Figure 17:
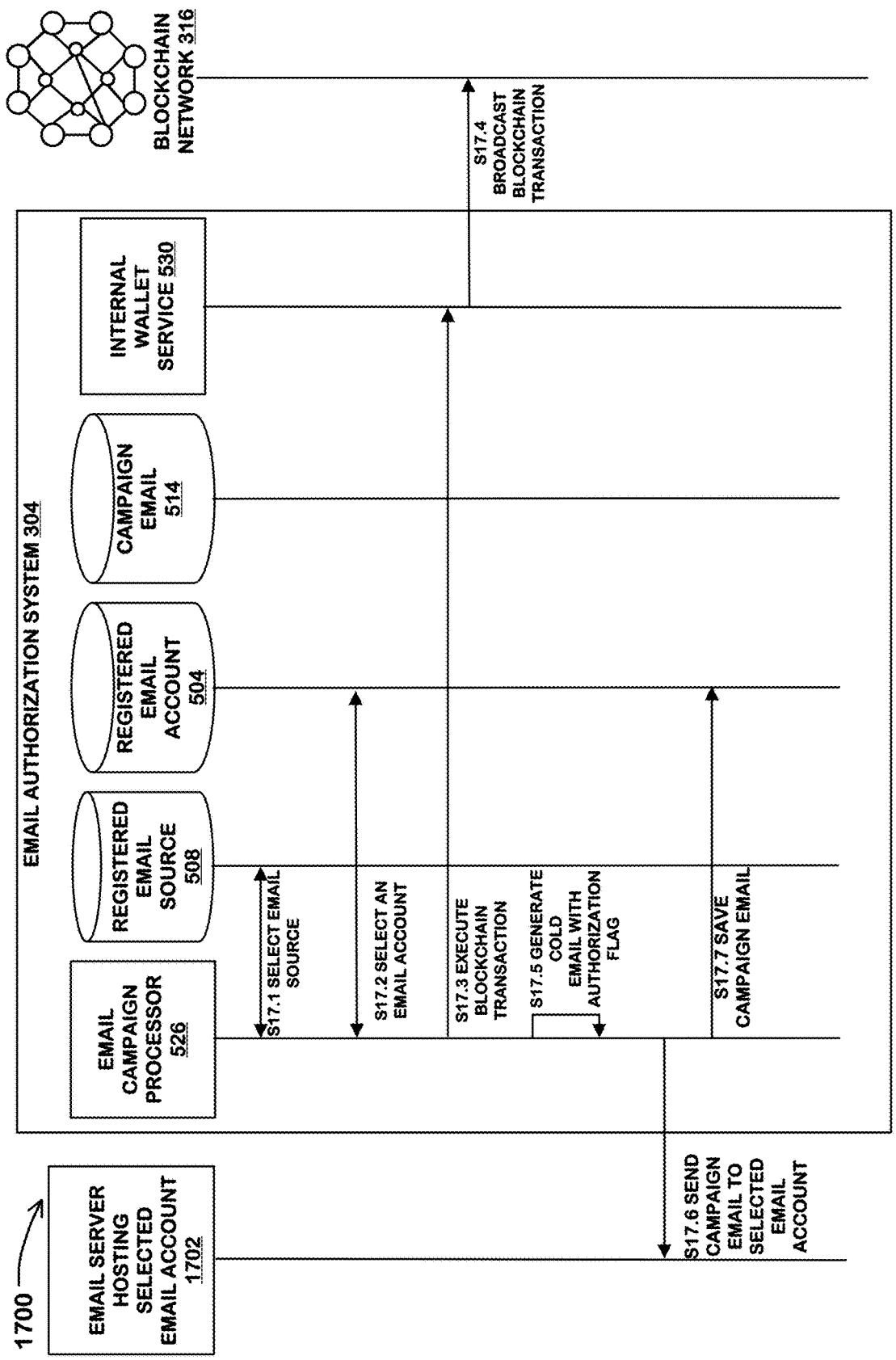
FIG. 17 is a sequence diagram illustrating a representative method of processing cold campaign email by the email campaign processor in FIG. 5.

FIG. 17 is an example workflow 1700 illustrating a representative method of processing cold email by the email campaign processor 526 in the email authorization system 304 in FIG. 5. In some embodiments, the actions in the workflow may be performed in different orders and with different, fewer or additional actions than those illustrated in FIG. 17. Multiple actions can be combined in some implementations.

FIG. 17 includes workflow 1700 that begins at step S17.1 when the email campaign processor 526 in the email authorization system 304 selects a registered email source from the registered email source database 508. The email campaign processor 526 will generate and validate cold email on behalf of the selected email source.

Workflow 1700 continues at step S17.2 where the email campaign processor 526 selects an email account from the registered email account database 504. In one embodiment, the email campaign processor 526 selects the email account based on the token budget per recipient of the email source. As used herein, a "recipient" is an email authorization system user, who has one or more email accounts registered with the system. Each recipient is associated with an expected number or type of tokens or cryptocurrency value which must be satisfied for authorization of a cold email for the recipient. The email campaign processor 526 selects a recipient email account such that the expected number of tokens of the recipient does not exceed the token budget per recipient of the email source. In one embodiment, the email campaign processor 526 may select multiple email accounts based on the daily token budget of the email source. The email campaign processor 526 selects the email accounts in such a way that the total expected number of tokens of all the recipients of the selected email accounts does not exceed the daily token budget of the email source.

At step S17.3, the email campaign processor 526 creates a blockchain address for each selected email account. The blockchain address is created with the private key of the email source and the private key of the selected email account in the internal wallet service 530. The email campaign processor 526 then executes a blockchain transaction associated with the blockchain address.

At step S17.4, the blockchain transaction is broadcasted to a blockchain network, specifying the first blockchain address and the characteristics of the transaction, such as an incentive associated with the cold email has been transferred to the wallet service of the selected email account.

At step S17.5, the email campaign processor 526 generates a cold email with the email content of the email source and validates the cold email by including an authorization tag. In one embodiment, the authorization tag is included in the header of the cold email.

At step S17.6, the email campaign processor 526 sends the validated cold email to a designated message folder such as the primary email inbox in the recipient (1702) email account in the email server.

At step S17.7, the email campaign processor 526 adds the cold email information to the campaign email database 514 along with the first blockchain address of the first blockchain transaction, and information regarding the email source.

Figure 18:
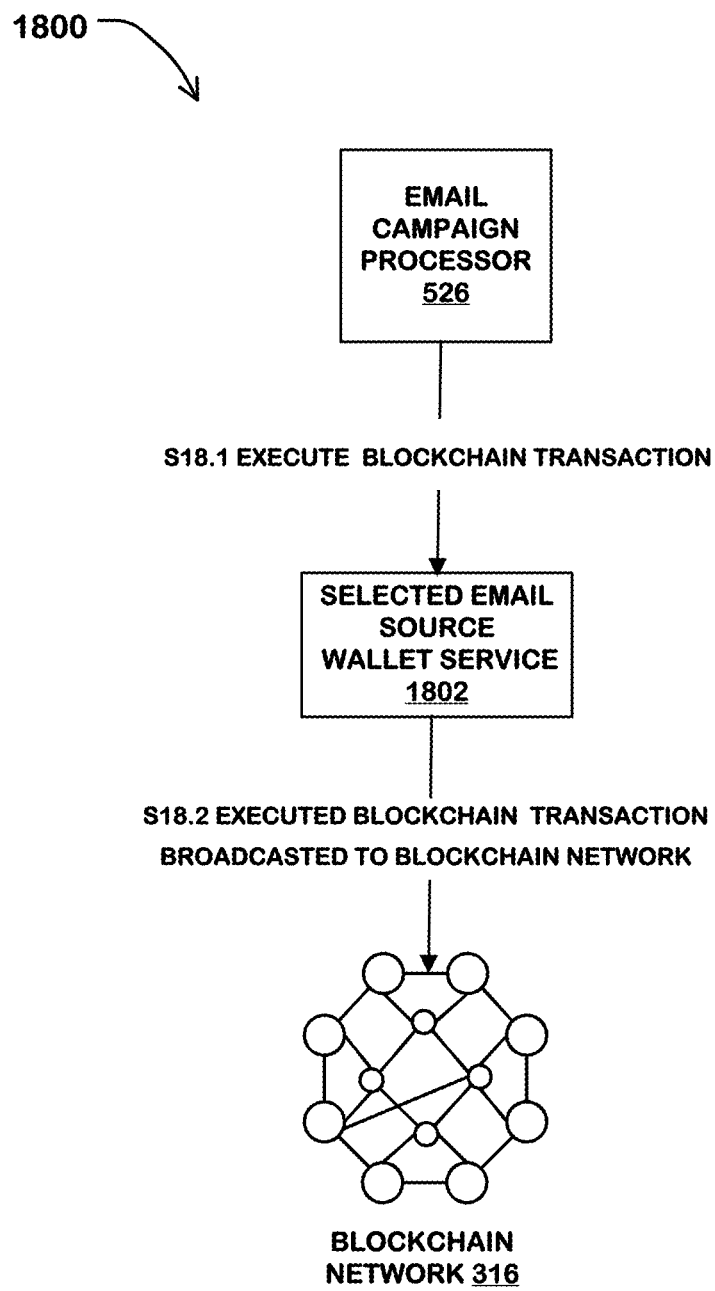
FIG. 18 illustrates a representative method of completing a blockchain transaction to validate a cold campaign email.

FIG. 18 illustrates a representative method 1800 of completing a blockchain transaction by the email campaign processor 526. At step S18.1, the email campaign processor 526 completes the blockchain transaction through a wallet service 1802 associated with the email source. In one embodiment, the email source wallet service 1802 may be an external wallet. In one embodiment, the email source wallet service 1802 may be the internal wallet service 530 of the email authorization system 304. The email source wallet service 1802 broadcasts the blockchain transaction to the blockchain network 316 at step S18.2. The blockchain transaction is entered into the blockchain ledgers in the blockchain network 316. After the blockchain transaction is verified in a blockchain network 316, the transfer of the cryptocurrency is logged in the wallet service of the recipient email account. For the sake of clarity, network(s) 318 is not included in FIG. 18.

Processing of Responses to Cold Email from Email Sources

Figure 19:
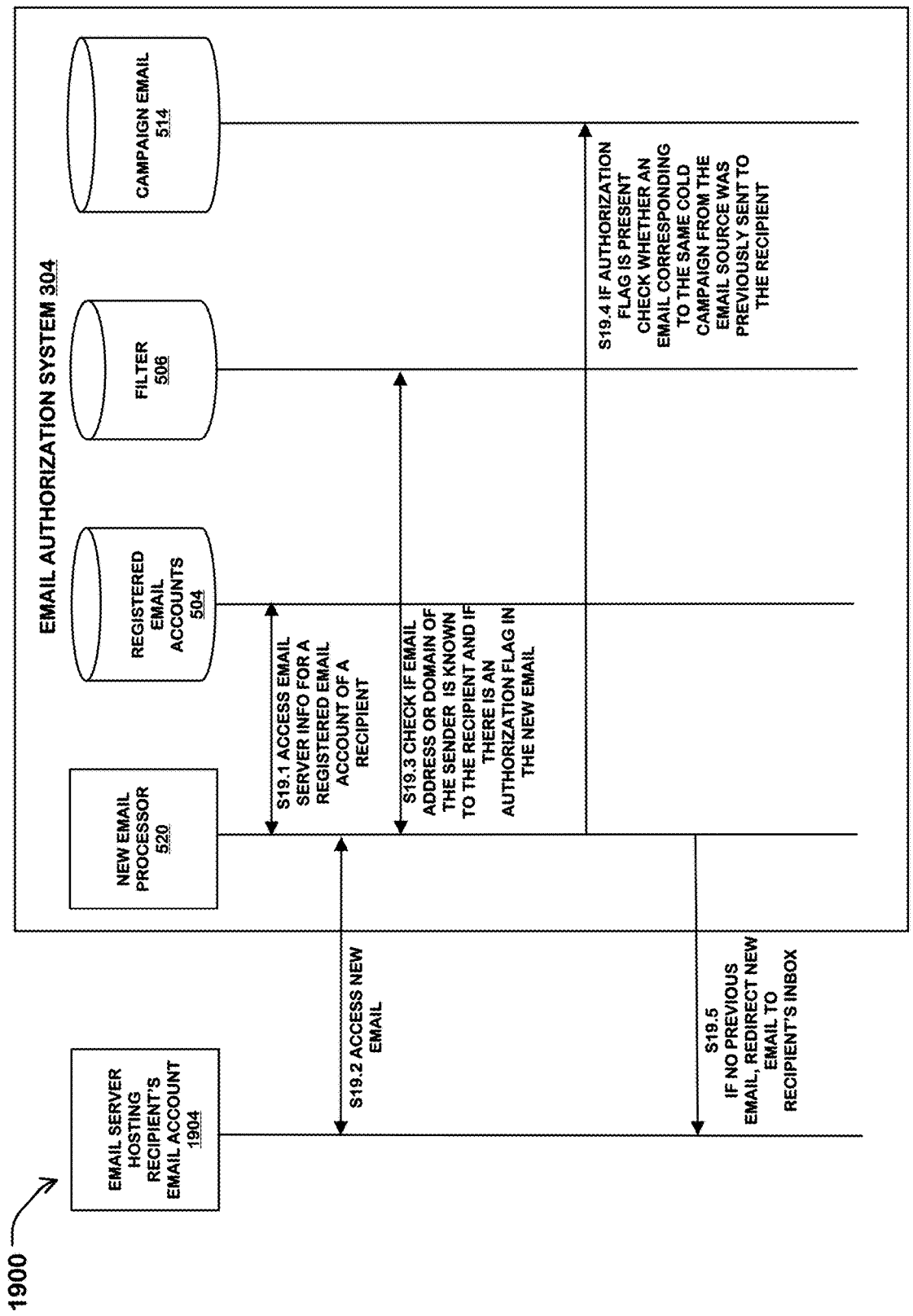
FIG. 19 is a sequence diagram illustrating a representative method of processing an email from a known sender by the new email processor in FIG. 5.

FIG. 19 is an example workflow 1900 illustrating a representative method of processing a cold email validated with an authorization tag from a registered email source by the new email processor 520 in the email authorization system 304. The cold email is delivered to the email channel of the recipient email account, and, in some embodiments, is saved in a message folder for the recipient email account on the email server 1904. In some embodiments, the actions in the workflow may be performed in different orders and/or with different, fewer or additional actions than those illustrated in FIG. 19. Multiple actions can be combined in some implementations.

FIG. 19 includes workflow 1900 that begins at step S19.1 when the new email processor 520 accesses the recipient email account information in the registered email account database 504. At step S19.2, the new email processor 520 accesses the recipient email account hosted by the email server 1904 with the email account information retrieved at step S19.2. The cold email validated with the authorization tag is included among the new email. At step S19.3, the new email processor 520 checks whether the sender email address or email address domain is listed in the recipient filter stored in the filter database 506 and whether the email includes an authorization flag. If the email does include an authorization flag, the new email processor 520 checks the campaign email database 514 to determine whether any cold email has been previously sent (i.e., email with "delivered to inbox status" in the campaign email database 514) by the email source to the recipient at step S19.4. At step S19.5, if a cold email has not been sent from the same cold email campaign by the email source to the recipient previously, the new email processor 520 in the email authorization system 304 can redirect the cold email to the email inbox folder of the recipient email account in the email server 1904. In one embodiment, the new email processor 520 checks the campaign email database 514 to establish the number of email messages sent to the recipient email account by the particular cold campaign of the email source. The new email processor 520 removes the email if the number of email messages exceeds a predetermined number of allowed email messages from the same email source or email campaign. In one such embodiment, the predetermined number of allowed email messages is one.

Processing of New Incoming Email from Unknown Senders

Figure 20:
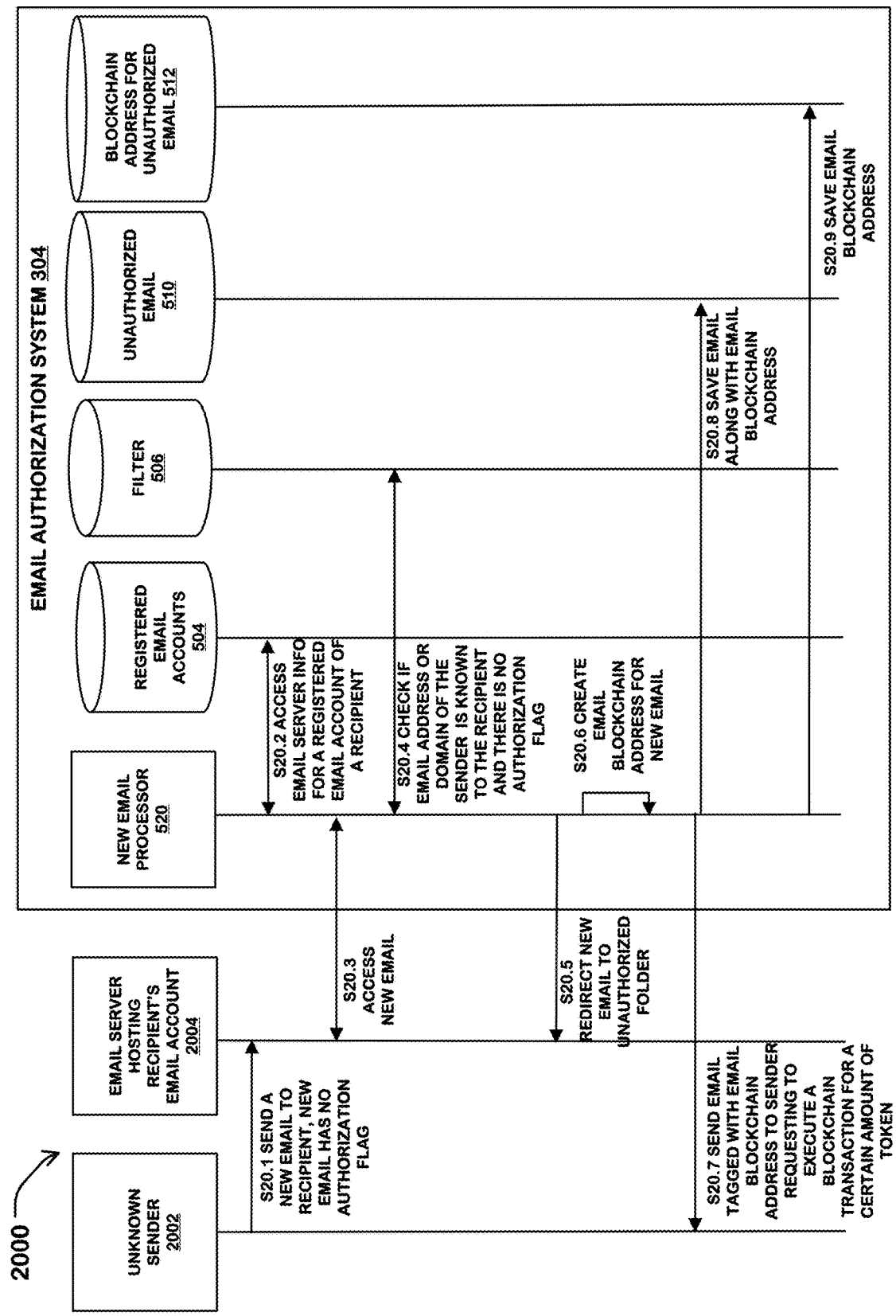
FIG. 20 is a sequence diagram illustrating a representative method of processing an email from an unknown sender by the new email processor in FIG. 5.

FIG. 20 is an example workflow 2000 illustrating a representative method of processing an email from an unknown sender (e.g., an email selected using the filter) by the new email processor 520 in the email authorization system 304. In some embodiments, the actions in the workflow may be performed in different orders and/or with different, fewer or additional actions than those illustrated in FIG. 20. Multiple actions can be combined in some implementations.

FIG. 20 includes workflow 2000 that begins at step S20.1 when an unknown email sender 2002 sends an email to a recipient. As the email is not from a registered email source, it does not include any authorization flags. The email is delivered to the email channel of the recipient email account, and, in some embodiments, is saved in a message folder for the recipient email account on the email server 2004. Workflow 2000 continues at step S20.2 when the new email processor 520 accesses recipient email account information in the registered email account database 504. At step S20.3, the new email processor 520 accesses the recipient email account hosted by the email server 2004 with the email account information retrieved at step S20.2. The email from the unknown sender 2002 from step S20.1 is included among the new email. At step S20.4, the new email processor 520 checks whether the sender email address or email address domain is listed in the recipient filter stored in the filter database 506 and whether the email includes an authorization flag. If the sender email address or email address domain is not included in the filter database 506 and the email does not include any authorization flags, the new email processor 520 in the email authorization system 304 classifies the email as unauthorized. The selected email classified as unauthorized is redirected in this example to an unauthorized email folder of the recipient email account on the email server 2004 at step S20.5. At step S20.6, the new email processor 520 creates a new blockchain address for the email. At step S20.7, the new email processor 520 sends, or causes the email server to send, an email or message tagged with the blockchain address created at step S20.6 to unknown sender 2002 and prompts execution of a certain transaction having specified characteristics, such as an amount or type of cryptocurrency, to enable the tagged email to be authorized for the recipient. In some embodiments, the new email processor 520 causes the email or message to be sent from email server 2004 having the recipient email address as a sender address. In another embodiment, the new email processor 520 causes the email or message to be sent to the unknown sender on behalf of the email authorization system 304. At step S20.8, the new email processor 520 saves the email in the unauthorized email database 510. At step S20.9, the new email processor 520 saves the blockchain address created at step S20.6 in the blockchain address for unauthorized email database 512.

Figure 21:
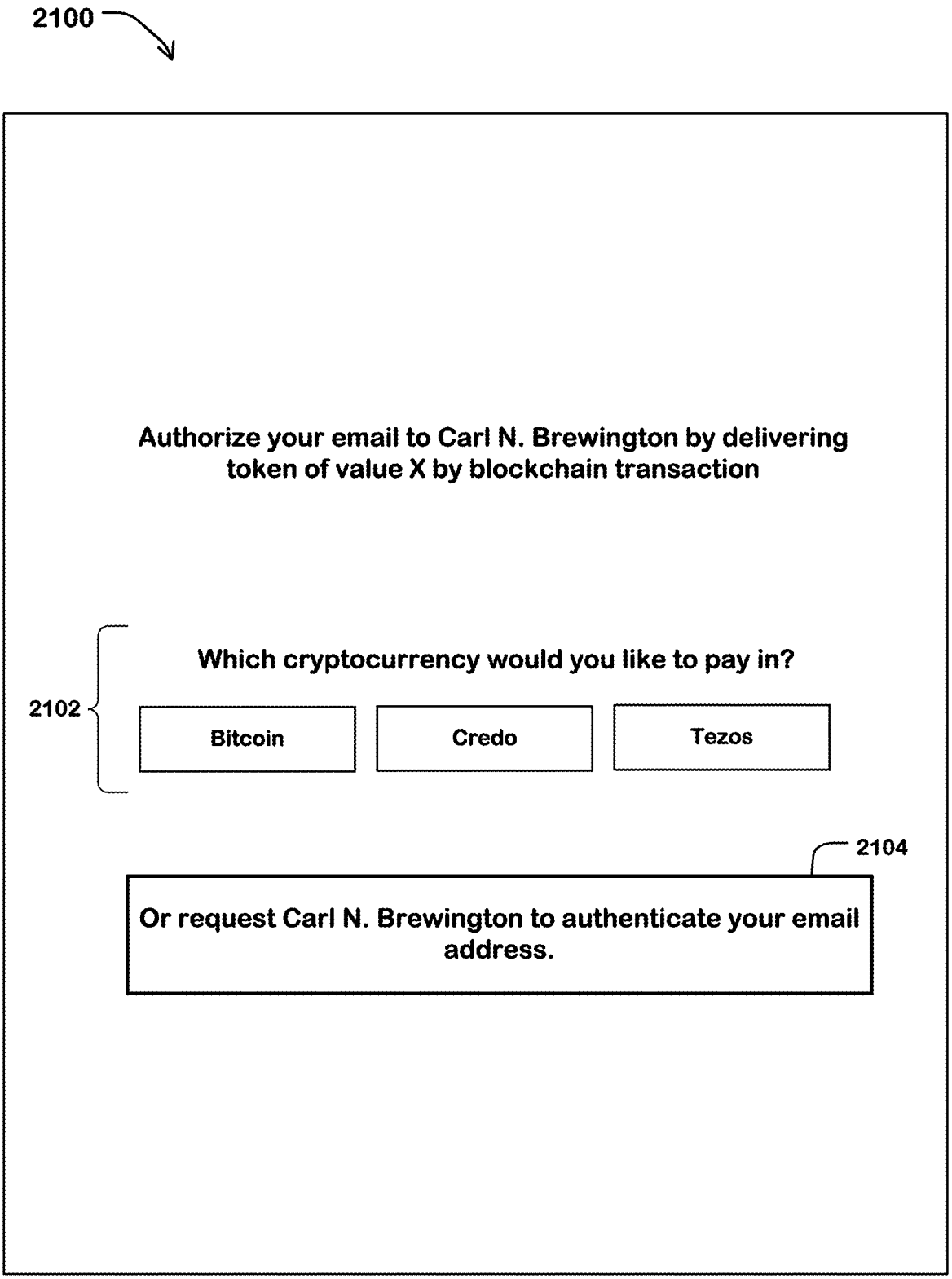
FIG. 21 illustrates an example message to an unknown sender prompting execution of a blockchain transaction in accordance with an implementation.

FIG. 21 illustrates an example message 2100 returned to the sender of tagged email, prompting execution of a blockchain transaction in accordance with an implementation. The transaction can be prompted by text or icons in the email, with an associated link to tools, such as a web interface to a transaction composition engine, or a widget, which when selected causes initiation of code that composes the transaction or messages required to execute the transaction. The message 2100 prompts the unknown sender to validate the email by executing a blockchain transaction, such as transferring a certain number of tokens or amount of cryptocurrency to a blockchain address assigned to the tagged email and logged by the email recipient. The prompts can include links to more than one type of blockchain transaction, such as transactions using available alternative types of cryptocurrencies 2102, reflected by tags in message 2100 in this example, and included in the illustrated example 2100 are icons for Bitcoin™, Credo™, and Tezos™. The message carries an active link to tools that can execute the blockchain transaction, that is selected by selecting a chosen one of the types of cryptocurrency. Thus, characteristics of the blockchain transaction in this example include an amount of cryptocurrency of one of the available types shown in the message and a value of the cryptocurrency. The message 2100 also carries the blockchain address, or a link to the blockchain address, created by the new email processor 520. The sender can opt to complete the blockchain transaction using the linked tools. The linked tools can enable the use of an internal or external wallet service. The blockchain transaction includes adding a record of the blockchain transaction into the blockchain ledgers in the blockchain network 316 with the tagged blockchain address.

The message also includes a link to a tool 2104 that causes sending of a request from the sender of the tagged email to the recipient, requesting that the sender email account be added to the filter to enable delivery to the recipient without requiring execution of the blockchain transaction. In some embodiments, the request can be included in a blockchain transaction using the address of the tagged email. The authorization server can include a process for composing return email messages linked to the individual blockchain addresses.

Figure 22:
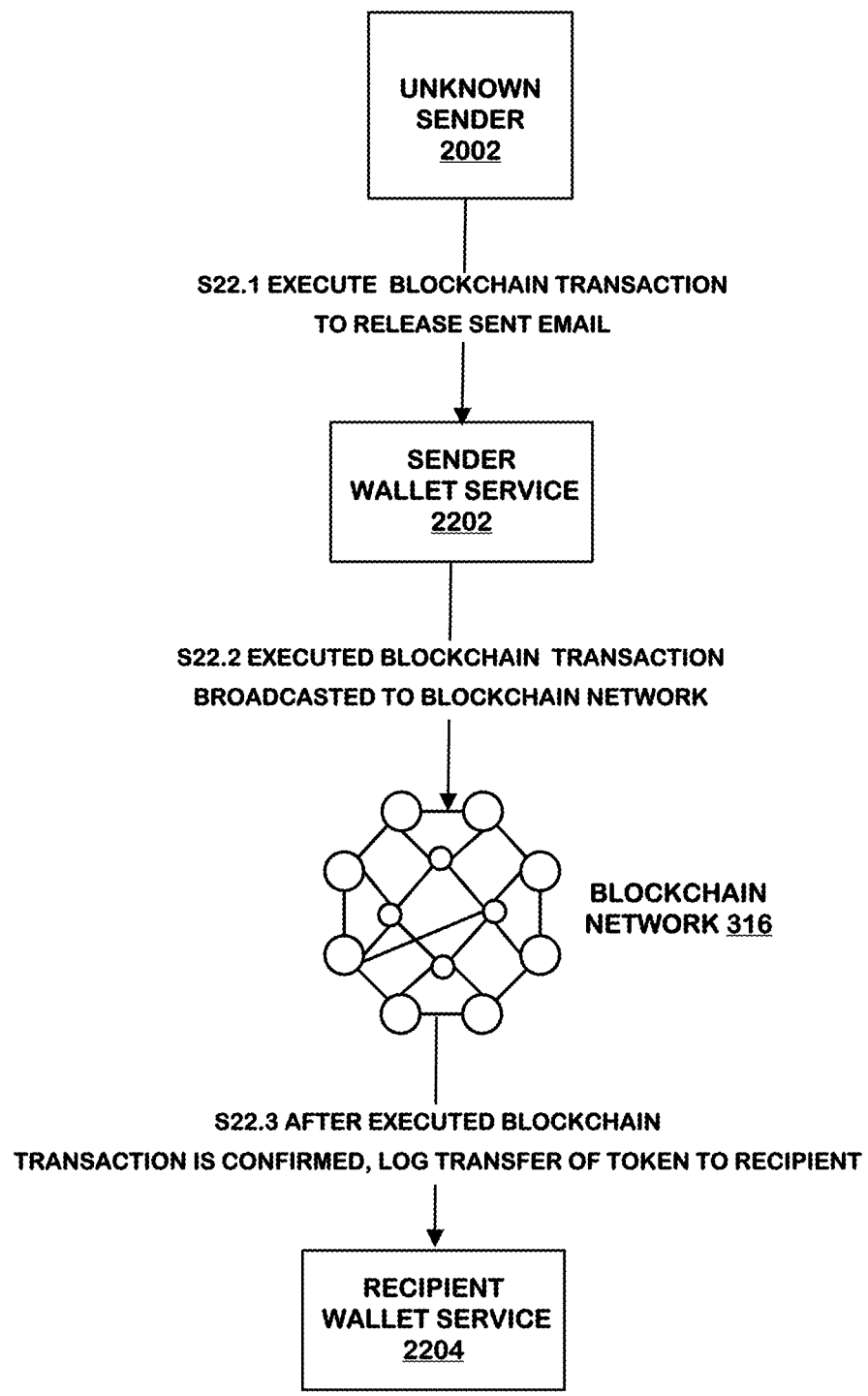
FIG. 22 illustrates a representative method of completing a blockchain transaction to authorize the release of an email.

FIG. 22 illustrates a representative method for the unknown sender 2002 to complete a blockchain transaction to authorize the release of the tagged email. At step S22.1, the unknown sender 2002 completes the blockchain transaction through the sender wallet service 2202. In one embodiment, the unknown sender 2002 may use the service of an external wallet. In one embodiment, the unknown sender 2002 may be an email authorization system user and may use the internal wallet service 530 of the email authorization system 304. The sender wallet service 2202 broadcasts the blockchain transaction to the blockchain network 316 at step S22.2. The blockchain transaction is entered into the blockchain ledgers in the blockchain network 316. After the blockchain transaction is verified in a blockchain network 316, the transfer of the cryptocurrency is logged in the recipient wallet 2204 at step S20.3. In one embodiment, the recipient may use the service of an external wallet. In one embodiment, the recipient may use the internal wallet service 530 of the email authorization system 304. For the sake of clarity, network(s) 318 is not included in FIG. 22.

Figure 23:
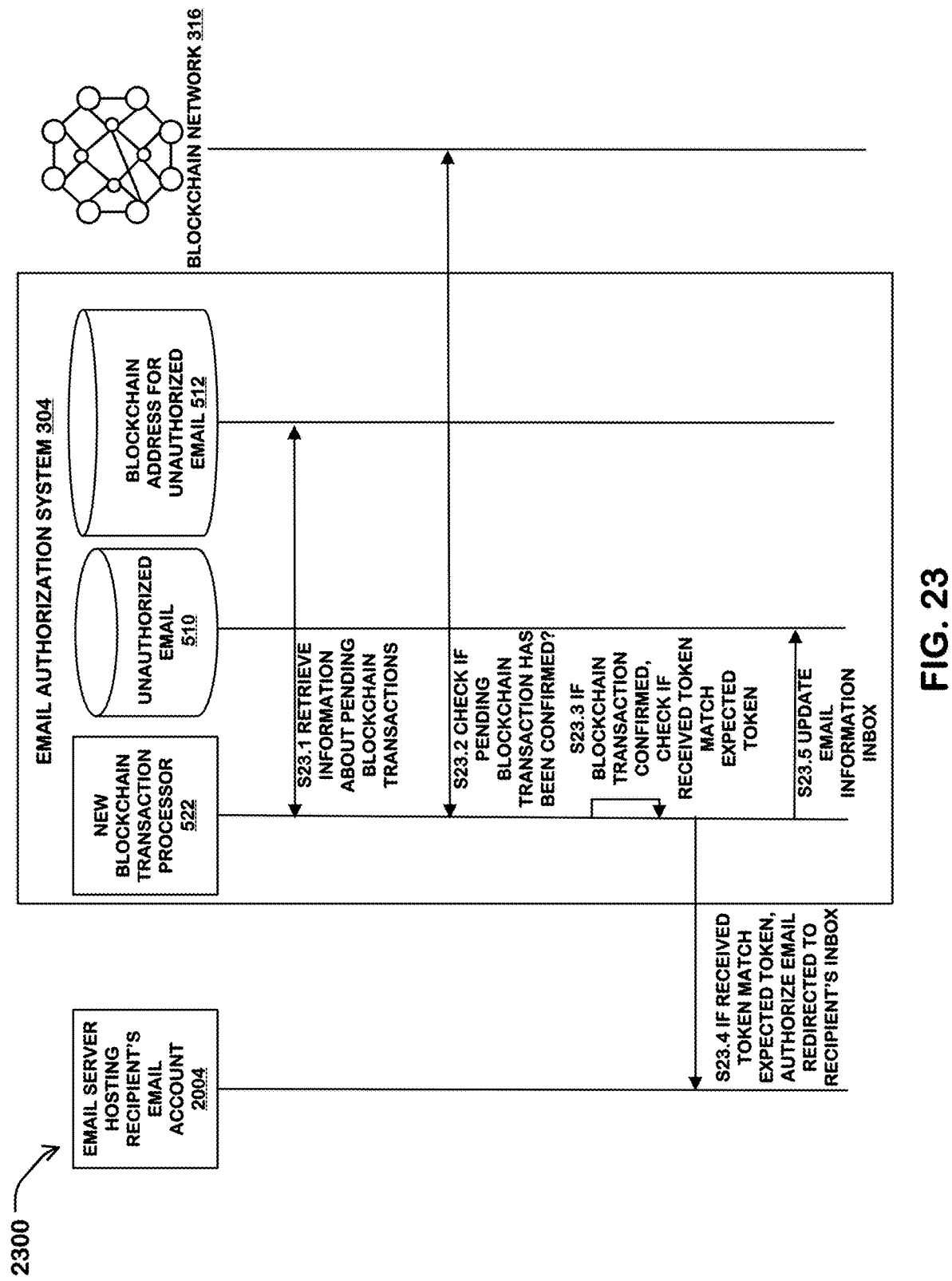
FIG. 23 is a sequence diagram illustrating a representative method of processing new blockchain transactions in the email authorization system by the new transaction processor in FIG. 5.

FIG. 23 is an example workflow 2300 illustrating a representative method of processing new blockchain transactions in the blockchain network 316 by the new blockchain transaction processor 522 in the email authorization system 304. In some embodiments, the actions in the workflow may be performed in different orders and/or with different, fewer or additional actions than those illustrated in FIG. 23. Multiple actions can be combined in some implementations.

FIG. 23 includes workflow 2300 that begins at step S23.1, when the new blockchain transaction processor 522 retrieves information about pending blockchain transactions and or/recently confirmed blockchain transactions from the blockchain address for unauthorized email database 512, including blockchain addresses of the pending transactions, of the recently confirmed transaction, or of both. The Workflow 2300 continues at step S23.1 where the new blockchain transaction processor 522 checks the blockchain ledgers in the blockchain network 316 to determine whether any pending or recently confirmed blockchain transaction has been confirmed against the retrieved blockchain addresses in unauthorized email database 510. At step S23.3, if a pending or recently confirmed transaction has been confirmed, the blockchain transaction processor 522 checks if the token is received, or other characteristics required, from the completed blockchain transaction matching the expected token of the email recipient. At step S23.4, if the token received from the completed blockchain transaction matches the expected token, the new blockchain transaction processor 522 marks the email as authorized. The email server can then transfer the authorized email to a designated message folder such as the primary email inbox in the recipient email account in email server 2004. At step S23.5, the new blockchain transaction processor 522 updates the information for the authorized email in the unauthorized email database 510 to specify that the blockchain transaction has been completed and the email has been released.

In some embodiments, the new blockchain transaction processor 522 may get a notification from the unknown sender wallet service or the recipient wallet service that a blockchain transaction has been completed. In such cases, the blockchain transaction processor 522 may check if the token received from the completed blockchain transaction matches the expected token of the email recipient. If the token received, or other characteristics required, from the completed blockchain transaction matches the expected characteristic, the new blockchain transaction processor 522 marks the email as authorized, and the authorized email can be moved from the unauthorized folder to the email inbox in the recipient email account.

Processing of New Incoming Email from Known Senders

Figure 24:
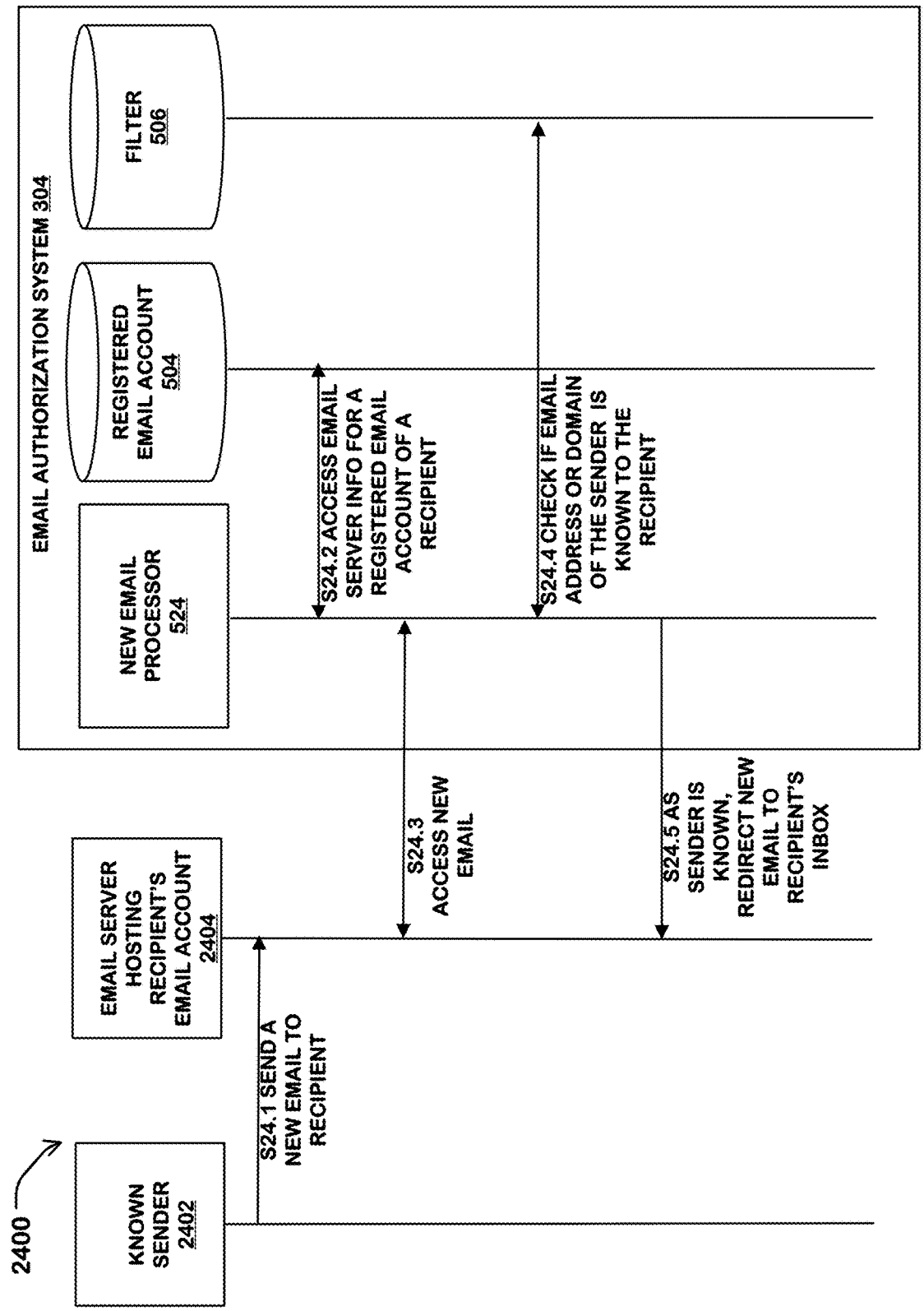
FIG. 24 is a sequence diagram illustrating a representative method of processing a cold campaign email by the new email processor in FIG. 5.

FIG. 24 is an example workflow 2400 illustrating a representative method of processing an email from a known sender by the new email processor 520 in the email authorization system 304. In some embodiments, the actions in the workflow may be performed in different orders and/or with different, fewer or additional actions than those illustrated in FIG. 24. Multiple actions can be combined in some implementations.

FIG. 24 includes workflow 2400 that begins at step S24.1 when a known email sender 2402 sends an email to a recipient. The sender 2402 is known to the recipient as evidenced by the sender information being already included in the recipient contact list and filter. The email is saved in a message folder, such as an inbox, for the recipient email account on the email server 2404. Workflow 2400 continues at step S24.2 where the new email processor 520 accesses recipient email account information in the registered email account database 504. At step S24.3, the new email processor 520 accesses the recipient email account hosted by the email server 2404 with the email account information retrieved at step S24.2. The email from the known sender 2402 from step S24.1 is included among the new email. At step S24.4, the new email processor 520 applies the filter to the new email in the email channel to check whether the known sender email address or email address domain is listed in the recipient filter stored in the filter database 506. If the sender email address or email address domain is included in the filter database 506, the new email processor 520 in the email authorization system 304 can then redirect the email to the email inbox folder of the recipient email account in the email server 2404 at step S24.5.

Email Authorization System Scheduler

Figure 25:
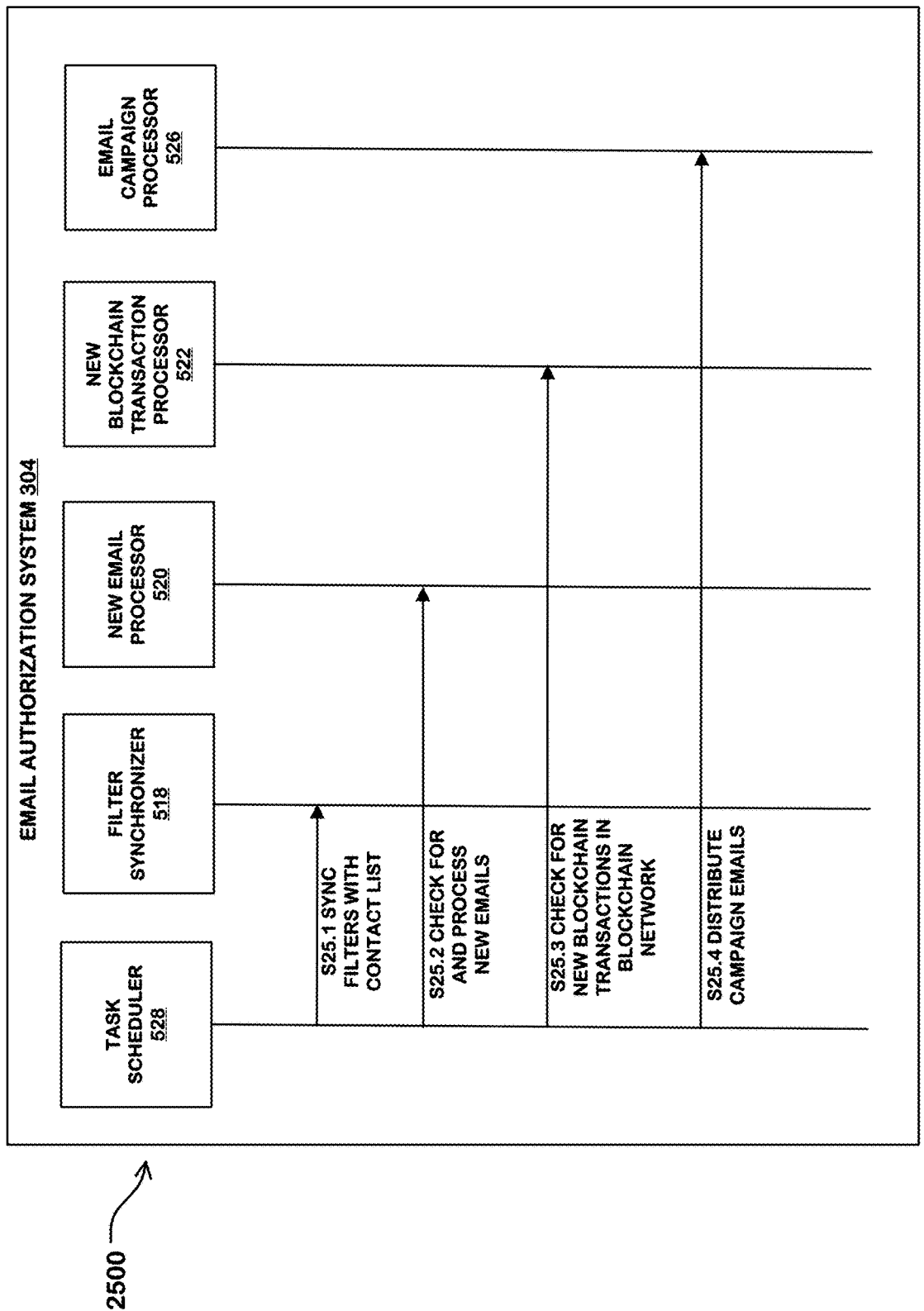
FIG. 25 is a sequence diagram illustrating a representative method of scheduling various tasks in the email authorization system by the task scheduler in FIG. 5.

FIG. 25 is an example workflow 2500 illustrating a representative method of scheduling various tasks by the task scheduler 528 in the email authorization system 304. In some embodiments, the actions in the workflow may be performed in different orders and/or with different, fewer or additional actions than those illustrated in FIG. 25. Multiple actions can be combined in some implementations.

In the workflow 2500, the task scheduler 528 schedules various tasks in the email authorization system 304, such as requesting the filter synchronizer 518 update the filter of each email authorization system user by checking for new contacts in a user contact list and email history maintained in a user email account (step S25.1), requesting the new email processor 520 to check for new email in each email authorization system user email account (step S25.2), requesting the new blockchain transaction processor 522 to check for new blockchain transactions in the blockchain network 316 (step S25.3), and requesting the email campaign processor 526 to distribute cold email to various registered email accounts on behalf of registered email sources (step S25.4). In some embodiments, the task scheduler 528 will request the filter synchronizer 518 to sync a user filter at timed intervals, such as every six hours. In some embodiments, the task scheduler 528 will request the new email processor 520 to check for new email at timed intervals, such as every fifteen minutes. In some embodiments, the task scheduler 528 will request the email campaign processor 526 to distribute new cold email at timed intervals, such as every day. In some embodiments, the task scheduler 528 will request the new blockchain transaction processor 522 to check for new blockchain transactions in the blockchain network 316 at timed intervals, such as every fifteen minutes.

Blockchain Transaction Block

Figure 26A:
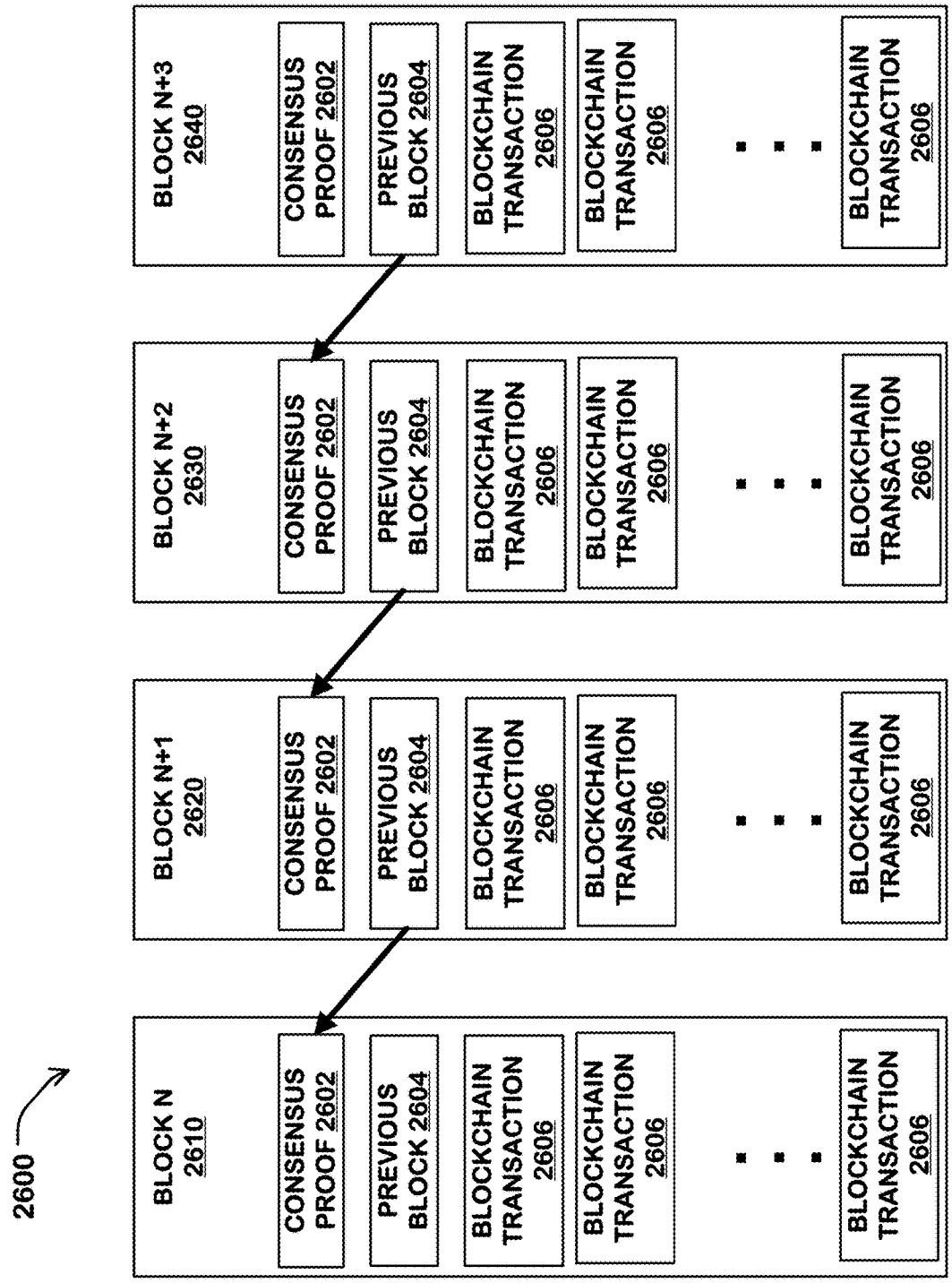

Blockchain network 316 is maintained by a network of nodes where every node executes and records the same blockchain transactions. Each node in the blockchain network 316 includes one or more distributed blockchain ledger data structure comprising a chain of blocks or "blockchain." This blockchain ledger data structure is replicated among the nodes in the blockchain network 316. FIG. 26A illustrates a segment of such a blockchain ledger data structure 2600, consisting of blocks 2610, 2620, 2630 and 2640. For the sake of clarity, only four blocks are included in FIG. 26A. Any number of blocks can be present in a blockchain structure.

Blockchain transactions 2606 are time-stamped and bundled into blocks where each block is identified by its cryptographic hash called the consensus proof 2602. The consensus proof can be determined by a consensus algorithm. Consensus algorithms that can be used for techniques described herein are the proof-of-stake algorithm (PoS), the practical *Byzantine* fault tolerance algorithm (PBFT), the proof-of-work algorithm (PoW), the delegated proof-of-stake algorithm (DPoS), the proof-of-authority algorithm (PoA) and the proof-of-importance algorithm (PoI). One skilled in the art would appreciate that, in other implementations, the consensus proof can be determined by any consensus algorithm.

The blocks 2610, 2620, 2630, 2640 form a sequence where each block references the consensus proof of the previous or parent block 2604, forming a chain of blocks. In some embodiments, a special data structure called a Merkle tree is used to store the blockchain transactions.

New blocks can be created and added to the blockchain in a process called mining. The nodes in the blockchain network 316 that perform the mining operations are called miners or stakers. New blockchain transactions are broadcast to all the nodes on the network. Each miner node creates its own block by collecting the new blockchain transactions and then finds a consensus proof for its block by performing complex cryptographic computations. The miners validate the blockchain transactions and reach a consensus on the block that should be added next to the blockchain. The newly mined block, called the winning block, is then broadcast to the entire network.

Blockchain is an immutable and durable data structure which maintains a record of the blockchain transactions that are tamper-resistant. Once a blockchain transaction is recorded in a block, it cannot be altered or deleted as long as a majority of the computational power of the network is not controlled by peers who collude to alter the blockchain.

While each miner on the blockchain network 316 can create its own block, only the block which has a consensus proof of a given difficulty is accepted to be added to the blockchain. The consensus mechanism ensures that all the nodes agree on the same block to contain the canonical blockchain transactions. Blockchain offers enhanced security as compared to centralized systems as every transaction is verified by multiple miners. The integrity of the transaction data recorded in the blocks is protected through strong cryptography. In addition to the transaction data, each block contains a consensus proof of itself and the consensus proof of the previous block. Any attempts to modify a transaction would result in a change in the consensus proof and would require all the subsequent blocks to be recomputed. This would be extremely difficult to achieve as long as the majority of miners do not cooperate to attack the network.

Figure 26B:
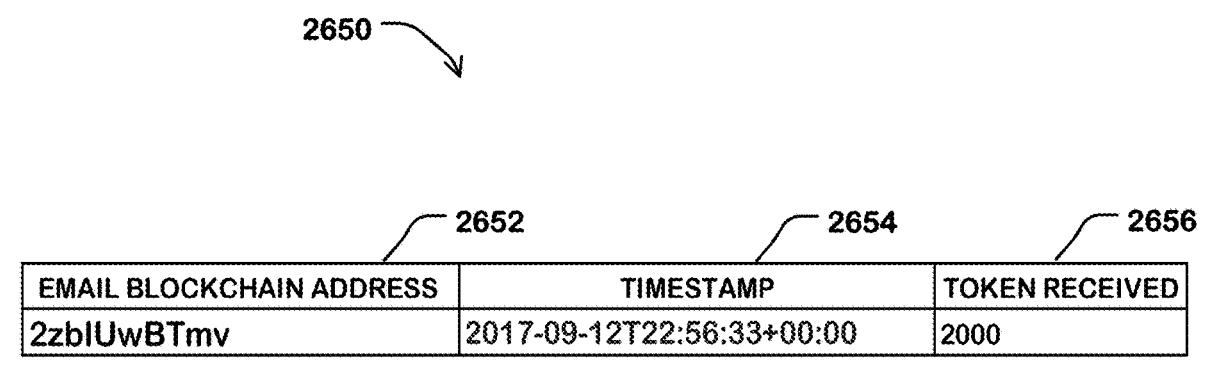

FIG. 26B illustrates an example blockchain transaction block 2650 located in block 2610 that implements the technology disclosed. The blockchain transaction block 2650 includes a the blockchain address 2652 associated with the blockchain transaction, a timestamp 2654 to record the time and date the blockchain transaction was completed, and the amount and type of tokens received 2656. The blockchain transaction block 2650 can also include other components which are not shown in FIG. 26B, such as header, nonce, balance, storage root, code hash, value, signature, ommers hash, beneficiary, state root, transactions root, receipts root, logs bloom, difficulty, number, private key, public key, extra data, and mix hash. One skilled in the art would appreciate that, in other implementations, the blockchain transaction block 2650 shown in FIG. 26B can be distributed across multiple blockchain ledgers in blockchain nodes in the blockchain network 316.

A number of workflows illustrating logic are described herein. The logic can be implemented using processors programmed using computer programs stored in memory accessible to the computer systems and executable by the processors. With all workflows herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the workflows herein show only steps that are pertinent to an understanding of the invention, and it will be understood that numerous additional steps for accomplishing other functions can be performed before, after and between those shown.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing descriptions, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for handling email, comprising:

maintaining a registry of email sources and blockchain addresses of blockchain transactions associated with the email sources in storage accessible to a data processor;

maintaining a registry of recipient email accounts and email addresses associated with the recipient email accounts in storage accessible to the data processor;

for a particular email source in the registry of email sources, traversing the registry of recipient email accounts using the data processor, and selecting a plurality of recipient email accounts from the registry of recipient email accounts; and for each selected recipient email account in the plurality of recipient email accounts, recording a blockchain transaction associated with the recipient email account and the blockchain address of the particular email source on a blockchain, and generating upon recording the blockchain transaction an email including an authorization flag to be sent to the email address of the selected recipient email account, the authorization flag in the email being validated by the transaction, and sending the email to the email address, monitoring an email channel of the selected recipient email account to select email addressed to recipient email addresses using filters associated with the selected recipient email account, the filters including information identifying parameters associated with pre-authorized email for the recipient email account;

the procedure for handling email further including, for email selected using the filters, establishing individual blockchain addresses for particular selected emails, and returning messages to senders of the particular email selected using the filters prompting execution of blockchain transactions using the individual blockchain addresses, the prompted blockchain transactions having specified characteristics required for authorization of the particular email, selected using the filters;

authorizing the particular email selected using the filters to recipient email accounts upon detection of a transaction in a blockchain network of the prompted blockchain transactions, and verification of the specified characteristics of the prompted blockchain transactions; and blocking email other than the email selected using the filters from email inboxes of the recipient email accounts.

2. The method of claim 1, wherein executing the blockchain transaction includes determining a second blockchain address associated with a selected recipient email account, and executing a blockchain transaction using the second blockchain address and the blockchain address of the particular email source.

3. The method of claim 1, including maintaining a record of account associated with the selected recipient email account, and wherein executing the blockchain transaction includes linking the blockchain addresses associated with the particular email source and encryption keys for blockchain transactions to the record of account associated with the selected recipient email account.

4. The method of claim 1, wherein the blockchain transaction comprises a transfer of cryptocurrency.

5. The method of claim 1, wherein the generated email includes an email header, and the authorization flag is a part of the email header.

6. The method of claim 1, further including traversing email inbox folders of the recipient email accounts.

7. The method of claim 1, including traversing email in email channels of the recipient email accounts.

8. The method of claim 1, wherein the particular email source is associated with a token budget, and the plurality of recipient email accounts are selected from the registry of recipient email accounts in dependence upon the token budget.

9. The method of claim 1, wherein the particular email source is associated with a token budget per recipient email account, and the plurality of recipient email accounts are selected from the registry of recipient email accounts in dependence upon the token budget per recipient email account.

10. The method of claim 1, wherein the particular email source is associated with an email delivery frequency, and email is generated to be sent to recipient email accounts in dependence upon the email delivery frequency.

11. A method for handling email, comprising:

maintaining a registry of email sources and blockchain addresses of blockchain transactions associated with the email sources in storage accessible to a data processor;

maintaining a registry of recipient email accounts and email addresses associated with the recipient email accounts in storage accessible to the data processor;

for a particular email source in the registry of email sources, traversing the registry of recipient email accounts using the data processor, and selecting a plurality of recipient email accounts from the registry of recipient email accounts; and for each selected recipient email account in the plurality of recipient email accounts, recording a blockchain transaction associated with the recipient email account and the blockchain address of the particular email source on a blockchain, and generating upon recording the blockchain transaction an email including an authorization flag to be sent to the email address of the selected recipient email account, the authorization flag in the email being validated by the transaction, and sending the email to the email address, monitoring an email channel of the selected recipient email account to select email addressed to recipient email addresses using filters associated with the selected recipient email account, the filters including information identifying parameters associated with pre-authorized email for the recipient email account; and including, for email selected using the filters, checking email headers of the particular email for authorization flags; and authorizing the particular email with authorization flags.

12. The method of claim 11, further comprising maintaining a list of email messages with authorization flags sent to recipient email accounts from email sources, and authorizing the particular email messages with authorization flags includes:

establishing a number of email messages sent to the selected recipient email account by the particular email source from the list of email messages; and blocking email if the number of email messages exceeds a predetermined number of allowed email messages.

13. The method of claim 12, wherein the predetermined number of allowed email messages is one.

14. A system, comprising:

one or more network nodes, where a network node of the one or more network nodes includes a communication interface, a processor or processors and memory accessible by the processor or processors;

the one or more network nodes configured for execution of a procedure for handling email, comprising:

maintaining a registry of email sources and blockchain addresses of blockchain transactions associated with the email sources in the accessible memory;

maintaining a registry of recipient email accounts and email addresses associated with the recipient email accounts in the accessible memory;

for a particular email source in the registry of email sources, selecting a plurality of recipient email accounts from the registry of recipient email accounts; and for each selected recipient email account in the plurality of recipient email accounts, recording a blockchain transaction associated with the recipient email account and the blockchain address of the particular email source on a blockchain, and generating upon recording the blockchain transaction an email including an authorization flag to be sent to the email address of the selected recipient email account, the authorization flag in the email being validated by the transaction, and sending the email to the email address, and monitoring an email channel of the selected recipient email account to select email addressed to recipient email addresses using filters associated with the selected recipient email account, the filters including information identifying parameters associated with pre-authorized email for the recipient email account, and the procedure for handling email further including, for email selected using the filters, establishing individual blockchain addresses for particular selected emails, and returning messages to senders of the particular email selected using the filters prompting execution of blockchain transactions using the individual blockchain addresses, the prompted blockchain transactions having specified characteristics required for authorization of the particular email selected using the filters;

authorizing the delivery of the particular email selected using the filters to recipient email accounts upon detection of a transaction in a blockchain network of the prompted blockchain transactions, and verification of the specified characteristics of the prompted blockchain transactions; and blocking email other than the email selected using the filters from email inboxes of the recipient email accounts.

15. The system of claim 14, wherein executing the blockchain transaction includes determining a second blockchain address associated with a selected recipient email account, and executing the blockchain transaction using the second blockchain address and the blockchain address of the particular email source.

16. The system of claim 14, including maintaining a record of account associated with the selected recipient email account, and wherein executing the blockchain transaction includes linking the blockchain addresses associated with the particular email source, and encryption keys for blockchain transactions, to the record of account associated with the selected recipient email account.

17. The system of claim 14, wherein the transaction comprises a transfer of cryptocurrency.

18. The system of claim 14, wherein the generated email includes an email header, and the authorization flag is a part of the email header.

19. The system of claim 14, further including traversing email inbox folders of the recipient email accounts.

20. The system of claim 14, including traversing email in email channels of the recipient email accounts.

21. The system of claim 14, wherein the particular email source is associated with a token budget, and the plurality of recipient email accounts are selected from the registry of recipient email accounts in dependence upon the token budget.

22. The system of claim 14, wherein the particular email source is associated with a token budget per recipient email account, and the plurality of recipient email accounts are selected from the registry of recipient email accounts in dependence upon the token budget per recipient email account.

23. The system of claim 14, wherein the particular email source is associated with an email delivery frequency, and email is generated to be sent to recipient email accounts in dependence upon the email delivery frequency.

24. A system, comprising:

one or more network nodes, where a network node of the one or more network nodes includes a communication interface, a processor or processors and memory accessible by the processor or processors;

the one or more network nodes configured for execution of a procedure for handling email, comprising:

maintaining a registry of email sources and blockchain addresses of blockchain transactions associated with the email sources in the accessible memory;

maintaining a registry of recipient email accounts and email addresses associated with the recipient email accounts in the accessible memory;

for a particular email source in the registry of email sources, selecting a plurality of recipient email accounts from the registry of recipient email accounts; and for each selected recipient email account in the plurality of recipient email accounts, recording a blockchain transaction associated with the recipient email account and the blockchain address of the particular email source on a blockchain, and generating upon recording the blockchain transaction an email including an authorization flag to be sent to the email address of the selected recipient email account, the authorization flag in the email being validated by the transaction, and sending the email to the email address, and monitoring an email channel of the selected recipient email account to select email addressed to recipient email addresses using filters associated with the selected recipient email account, the filters including information identifying parameters associated with pre-authorized email for the recipient email account, and including, for email selected using the filters, checking email headers of the particular email for authorization flags; and authorizing the particular email with authorization flags.

25. The system of claim 24, further comprising maintaining a list of email with authorization flags sent to recipient email accounts from email sources, and authorizing the particular email with authorization flags includes:

establishing a number of email messages sent to the selected recipient email account by the particular email source from the list of email; and blocking email if the number of email messages exceeds a predetermined number of allowed email messages.

26. The system of claim 25, wherein the predetermined number of allowed email messages is one.

27. A computer program product, comprising:

a non-transitory machine readable memory;

a computer program stored in the memory, the computer program including instructions configured for execution of a procedure for handling email, comprising:

maintaining a registry of email sources and blockchain addresses of blockchain transactions associated with the email sources;

maintaining a registry of recipient email accounts and email addresses associated with the recipient email accounts;

for a particular email source in the registry of email sources, selecting a plurality of recipient email accounts from the registry of recipient email accounts; and for each selected recipient email account in the plurality of recipient email accounts, recording a blockchain transaction associated with the recipient email account and the blockchain address of the particular email source on a blockchain, and generating upon recording the blockchain transaction an email including an authorization flag to be sent to the email address of the selected recipient email account, the authorization flag in the email being validated by the transaction, and monitoring an email channel of the selected recipient email account to select email addressed to recipient email addresses using filters associated with the selected recipient email account, the filters including information identifying parameters associated with pre-authorized email for the recipient email account, and the procedure for handling email further including, for email selected using the filters, establishing individual blockchain addresses for particular selected emails, and returning messages to senders of the particular email selected using the filters prompting execution of blockchain transactions using the individual blockchain addresses, the prompted blockchain transactions having specified characteristics required for authorization of the particular email selected using the filters;

authorizing the delivery of the particular email selected using the filters to recipient email accounts upon detection of a transaction in a blockchain network of the prompted blockchain transactions, and verification of the specified characteristics of the prompted blockchain transactions; and blocking email other than the email selected using the filters from email inboxes of the recipient email accounts.

28. The computer program product of claim 27, wherein executing the blockchain transaction includes determining a second blockchain address associated with a selected recipient email account, and executing the blockchain transaction using the second blockchain address and the blockchain address of the particular email source.

29. The computer program product of claim 27, including maintaining a record of account associated with the selected recipient email account, and wherein executing the blockchain transaction includes linking the blockchain addresses associated with the particular email source and encryption keys for blockchain transactions to the record of account associated with the selected recipient email account.

30. The computer program product of claim 27, wherein the blockchain transaction comprises a transfer of cryptocurrency.

31. The computer program product of claim 27, wherein the generated email includes an email header, and the authorization flag is a part of the email header.

32. The computer program product of claim 27, further including traversing email inbox folders of the recipient email accounts.

33. The computer program product of claim 27, where including traversing email in email channels of the recipient email accounts.

34. The computer program product of claim 27, wherein the particular email source is associated with a token budget, and the plurality of recipient email accounts are selected from the registry of recipient email accounts in dependence upon the token budget.

35. The computer program product of claim 27, wherein the particular email source is associated with a token budget per recipient email account, and the plurality of recipient email accounts are selected from the registry of recipient email accounts in dependence upon the token budget per recipient email account.

36. The computer program product of claim 27, wherein the particular email source is associated with an email delivery frequency, and email is generated to be sent to recipient email accounts in dependence upon the email delivery frequency.

37. A computer program product, comprising:
a non-transitory machine readable memory;
a computer program stored in the memory, the computer program including instructions configured for execution of a procedure for handling email, comprising:
maintaining a registry of email sources and blockchain addresses of blockchain transactions associated with the email sources;
maintaining a registry of recipient email accounts and email addresses associated with the recipient email accounts;
for a particular email source in the registry of email sources, selecting a plurality of recipient email accounts from the registry of recipient email accounts; and
for each selected recipient email account in the plurality of recipient email accounts, recording a blockchain transaction associated with the recipient email account and the blockchain address of the particular email source on a blockchain, and generating upon recording the blockchain transaction an email including an authorization flag to be sent to the email address of the selected recipient email account, the authorization flag in the email being validated by the transaction, and monitoring an email channel of the selected recipient email account to select email addressed to recipient email addresses using filters associated with the selected recipient email account, the filters including information identifying parameters associated with pre-authorized email for the recipient email account, and
including, for email selected using the filters, checking email headers of the particular email for authorization flags; and
authorizing the particular email with authorization flags.

38. The computer program product of claim 37, further comprising maintaining a list of email messages with authorization flags sent to recipient email accounts from email sources, and authorizing the particular email messages with authorization flags includes:
establishing a number of email messages sent to the selected recipient email account by the particular email source from the list of email messages; and
blocking email if the number of email messages exceeds a predetermined number of allowed email messages.

39. The computer program product of claim 38, wherein the predetermined number of allowed email messages is one.

* * * * *